(12) United States Patent
Mori

(10) Patent No.: US 9,110,610 B2
(45) Date of Patent: Aug. 18, 2015

(54) OUTPUT SYSTEM, OUTPUT METHOD, AND OUTPUT APPARATUS

(71) Applicant: Keisuke Mori, Tokyo (JP)

(72) Inventor: Keisuke Mori, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/520,502

(22) Filed: Oct. 22, 2014

(65) Prior Publication Data

US 2015/0116756 A1   Apr. 30, 2015

(30) Foreign Application Priority Data

Oct. 31, 2013   (JP) .................................. 2013-226967

(51) Int. Cl.
| | |
|---|---|
| *G06F 15/00* | (2006.01) |
| *G06F 1/00* | (2006.01) |
| *G06K 1/00* | (2006.01) |
| *G06F 3/12* | (2006.01) |
| *H04N 1/00* | (2006.01) |
| *H04N 1/60* | (2006.01) |

(52) U.S. Cl.
CPC ............ *G06F 3/1204* (2013.01); *G06F 3/1205* (2013.01); *G06F 3/1222* (2013.01); *G06F 3/1238* (2013.01); *G06F 3/1285* (2013.01); *H04N 1/00244* (2013.01); *H04N 1/00411* (2013.01); *H04N 1/00477* (2013.01); *H04N 1/00854* (2013.01); *H04N 2201/0094* (2013.01)

(58) Field of Classification Search
CPC ... G06F 3/1204; G06F 3/1205; G06F 3/1222; G06F 3/1238; H04N 1/00244; H04N 1/00854; H04N 1/00411; H04N 1/00477

USPC .................................................. 358/1.1–1.15
See application file for complete search history.

(56) References Cited

U.S. PATENT DOCUMENTS

| | | | | |
|---|---|---|---|---|
| 8,879,097 | B2 * | 11/2014 | Matsuba | 358/1.15 |
| 2010/0302575 | A1 | 12/2010 | Hanaoka et al. | |
| 2011/0164272 | A1 * | 7/2011 | Kusakabe | 358/1.14 |
| 2011/0317215 | A1 | 12/2011 | Ida et al. | |

FOREIGN PATENT DOCUMENTS

| | | |
|---|---|---|
| JP | 2008-071196 | 3/2008 |
| JP | 2011-141795 | 7/2011 |
| JP | 2013-030022 | 2/2013 |

OTHER PUBLICATIONS

Extended European search report dated Mar. 5, 2015.

* cited by examiner

*Primary Examiner* — Douglas Tran
(74) *Attorney, Agent, or Firm* — IPUSA, PLLC

(57) ABSTRACT

An output system includes a terminal apparatus, an output apparatus, and an information processing apparatus that are interconnected via a network. The output system includes a unit that registers an output request for output data received from the terminal apparatus that is operated by a registering user, a unit that displays information on the registering user that has designated an outputting user operating the output apparatus as a delegate user and receives a selection of the registering user from the outputting user, a unit that receives from the output apparatus an acquisition request for the output request of the selected registering user and provides the requested output request to the output apparatus, and a unit that receives a selection of the output request from the outputting user, acquires the output data of the selected output request, and outputs the acquired output data at the output apparatus.

15 Claims, 23 Drawing Sheets

FIG.7

| COLUMN NAME | PARAMETER EXAMPLE |
|---|---|
| SERVER ID | 1 |
| IP ADDRESS | 192.168.10.11 |
| HOST NAME | Server_A |
| PORT NUMBER | 8080 |
| PORT NUMBER (https) | 8443 |

FIG.8

| COLUMN NAME | PARAMETER EXAMPLE |
|---|---|
| DOCUMENT ID | 100 |
| USER NAME | AAA |
| USER DISPLAY NAME | User_A |
| SERVER ID | 1 |
| JOB NAME | aaa.Txt |
| DATA STORAGE DESTINATION (DATA PATH) | C:¥data |
| LANGUAGE | PCL |
| NUMBER OF PAGES | 10 |
| PRINT SIDE SETTING | 1(SINGLE SIDE) |
| COLOR INFORMATION | 1(BLACK & WHITE) |
| NUMBER OF COPIES | 5 |

FIG.9

Authentication Server

Host Name/IP Address　　　192.168.10.xx

Port　　　8443

[ Connection Test ] ~1001

Print Server

Host Name/IP Address　　　192.168.10.xx

Port　　　8080

SSL　　　| ON | OFF |

[ Connection Test ] ~1002

Authentication Setting

User Name　　　User_A

Password　　　*******

[ OK ]　[ Cancel ]

Edit User

| OK | Cancel |

- Login User Name: XXX
- Display Name: Owner_A
- Password: [Edit]
- Card Information: [Edit]
- Delegate User Information: AAA BBB [Edit] ~1011
- Authorization Information: [Edit]

Delegate User Setting

| OK | Cancel |

Login User Name: [          ] [Search]

| | Login User | Display Name |
|---|---|---|
| ■ | AAA | User_A |
| ■ | BBB | User_B |
| □ | CCC | User_C |
| □ | DDD | User_D |
| □ | EEE | User_E |

~1020 http://192.168.10.xx:8080/GetOwnerList hostName = 192.168.10.xxx ownerNameList = Owner_A, Owner_B

FIG.21

| COLUMN NAME | PARAMETER EXAMPLE |
|---|---|
| DOCUMENT ID | 100 |
| USER NAME | AAA |
| USER DISPLAY NAME | User_A |
| SERVER ID | 1 |
| JOB NAME | aaa.txt |
| DATA STORAGE DESTINATION (DATA PATH) | C:¥data |
| LANGUAGE | PCL |
| NUMBER OF PAGES | 10 |
| PRINT SIDE SETTING | 1(SINGLE SIDE), 2(DOUBLE SIDE) |
| COLOR INFORMATION | 1(BLACK & WHITE), 2(COLOR) |
| NUMBER OF COPIES | 5 |
| PRINT DELEGATES | 10, 11 |

FIG.22

```
┌─────────────────────────────────────────────────┐
│           Print Job Setting              ☒     │
├─────────────────────────────────────────────────┤
│                                                 │
│  Delegate Printing   ◉ Perform delegate printing│
│                      ○ Do not perform delegate printing │
│                                                 │
│                                                 │          ~1100
│                                                 │
│                                                 │
│  ☒ Select each time                             │
└─────────────────────────────────────────────────┘
```

Delegate User Setting

|  | Login User Name | Display Name |
|---|---|---|
| ■ | AAA | User_A |
| ■ | BBB | User_B |
| ☐ | CCC | User_C |
| ☐ | DDD | User_D |
| ☐ | EEE | User_E |

Select Delegate User Candidate — 1111

Output Printer    Printer_A

OK    Cancel

```
@PJL JOB NAME = "aaa.txt" #Owner_A#10#11#
@PJL SET DATE = "2013/08/29"
@PJL SET TIME = "11:11:32"
@PJL SET JOBOFFSET = OFF
@PJL SET COPIES = 1
@PJL SET QTY = 1
...
```

FIG.27 http://192.168.10.xx:8080/GetOwnerList hostName = 192.168.10.xxx delegateUserId = 10

OUTPUT SYSTEM, OUTPUT METHOD, AND OUTPUT APPARATUS

BACKGROUND OF THE INVENTION

1. Field of the Invention

The present invention relates to an output system, an output method, and an output apparatus.

2. Description of the Related Art

Print systems are known that implement a mechanism for attaching to a print job a user execution authorization table that stores user information of a user authorized to execute the print job. In this way, the print system enables a user other than the user that has spooled the print job to execute the print job without compromising security (see e.g. Japanese Laid-Open Patent Publication No. 2008-71196).

For example, the so-called pull print system implements a mechanism for initially storing a print job registered by a user operating a client terminal and subsequently executing the print job at an image forming apparatus in response to a print instruction from the user that has successfully logged into the image forming apparatus. In some pull print systems, a delegate user may be set up such that a user other than a registering user that has registered a print job may be able to execute the print job.

However, to enable a user other than the registering user that has registered a print job to execute the print job, a delegate user has to be set up each time a print job is registered thereby imposing a burden on the registering user.

Note that the above problem may be encountered not only in pull print systems but in other various types of output systems that are configured to have an output apparatus such as a projector or a monitor output a job stored in a storage destination by a user.

Accordingly, there is a demand for a technique that enables a user to easily set up delegate output settings.

SUMMARY OF THE INVENTION

According to one embodiment of the present invention, an output system is provided that includes a terminal apparatus, an output apparatus, and at least one information processing apparatus that are interconnected via a network. The output system includes a registration process unit configured to register an output request for output data received from the terminal apparatus that is operated by a registering user, a selection receiving unit configured to display at the output apparatus information on the registering user that has designated an outputting user operating the output apparatus as a delegate user and receive a selection of the registering user from the outputting user, an output request providing unit configured to receive from the output apparatus an acquisition request for the output request of the registering user selected by the outputting user and provide to the output apparatus the output request of the registering user selected by the outputting user, and an output process unit configured to receive a selection of the output request for output data from the outputting user, acquire the output data of the selected output request from a storage destination, and output the acquired output data at the output apparatus.

BRIEF DESCRIPTION OF THE DRAWINGS

FIG. 7 illustrates an exemplary configuration of server information;

FIG. 8 illustrates an exemplary configuration of print job information;

FIG. 9 illustrates an exemplary setting screen of the client terminal;

FIGS. 10A and 10B illustrate exemplary screens for accepting delegate user settings;

FIG. 21 illustrates another exemplary configuration of print job information;

FIG. 22 illustrates an exemplary delegate print accepting screen;

FIG. 23 illustrates an exemplary delegate user setting screen;

FIG. 27 illustrates another example of inquiry information sent to the print server apparatus to inquire about the number of print jobs registered by an owner.

DESCRIPTION OF THE PREFERRED EMBODIMENTS

In the following, embodiments of the present invention are described with reference to the accompanying drawings.

Note that although a print system is described below as an exemplary embodiment of an output system, the present invention is not limited to a print system but may also be applied to other various types of output systems such as an image projection system and a display system that are configured to output a job stored in a storage destination.

First Embodiment

System Configuration

Figure 1:
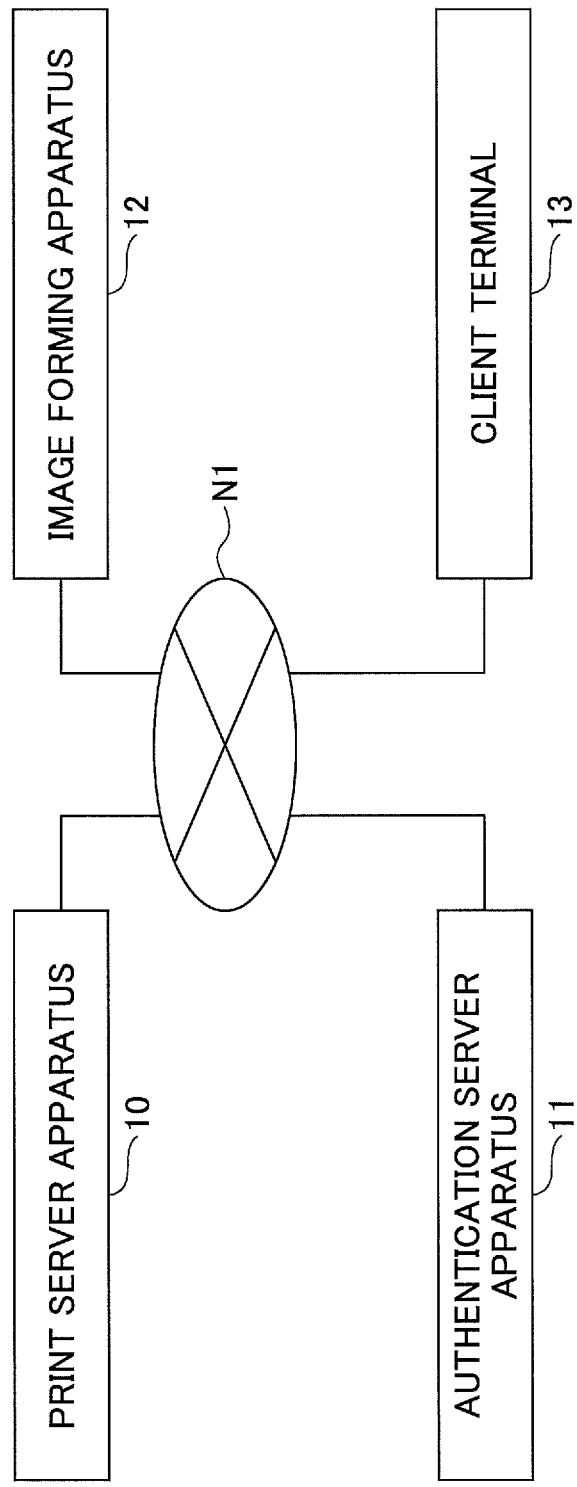
FIG. 1 illustrates an exemplary configuration of a print system according to an embodiment of the present invention.

FIG. 1 is a block diagram illustrating an exemplary configuration of a print system according to an embodiment of the present invention. In FIG. 1, the print system 1 includes a print server apparatus 10, an authentication server apparatus 11, an image forming apparatus 12, and a client terminal 13 that are connected to a network N1 such as a local area network (LAN). The print server apparatus 10, the authentication server apparatus 11, the image forming apparatus 12, and the client terminal 13 may include features for establishing wired or wireless communication. Note that although the exemplary print system illustrated in FIG. 1 includes one of the print server apparatus 10, the authentication server apparatus 11, the image forming apparatus 12, and the client terminal 13, a plurality of the above devices may be included in the print system.

The print server apparatus 10 may be implemented by at least one information processing apparatus. The print server apparatus 10 stores print data and print job information, and transmits the stored print data and print job information to the image forming apparatus 12 in response to a request from the image forming apparatus 12, for example.

The authentication server apparatus 11 may be implemented by at least one information processing apparatus. The authentication server apparatus 11 stores user information, and performs authentication in response to a request from the image forming apparatus 12, for example. The authentication server apparatus 11 also provides a delegate user setting function as described below. The image forming apparatus 12 is an exemplary embodiment of an output apparatus that is connected to the network N1 through wired or wireless communication. The image forming apparatus 12 may be a printing apparatus such as a printer, a copier, a scanner, or a multifunction peripheral (MFP); a display apparatus that displays (outputs) an image on a monitor; or a projection apparatus that projects (outputs) an image on a projector, for example. Also, an audio output apparatus for outputting audio data may be used, for example.

The client terminal 13 is a terminal apparatus that is operated by a user. The client terminal 13 may be a smartphone, a mobile phone, or a personal computer (PC), for example. The client terminal 13 has a client tool such as a plug-in installed therein that provides a delegate user setting function as described below.

Note that FIG. 1 illustrates merely one exemplary configuration of the print system 1 according to the present embodiment. That is, the print system 1 is not limited to the configuration as illustrated in FIG. 1 but may have other various configurations.

<Hardware Configuration>

Figure 2:
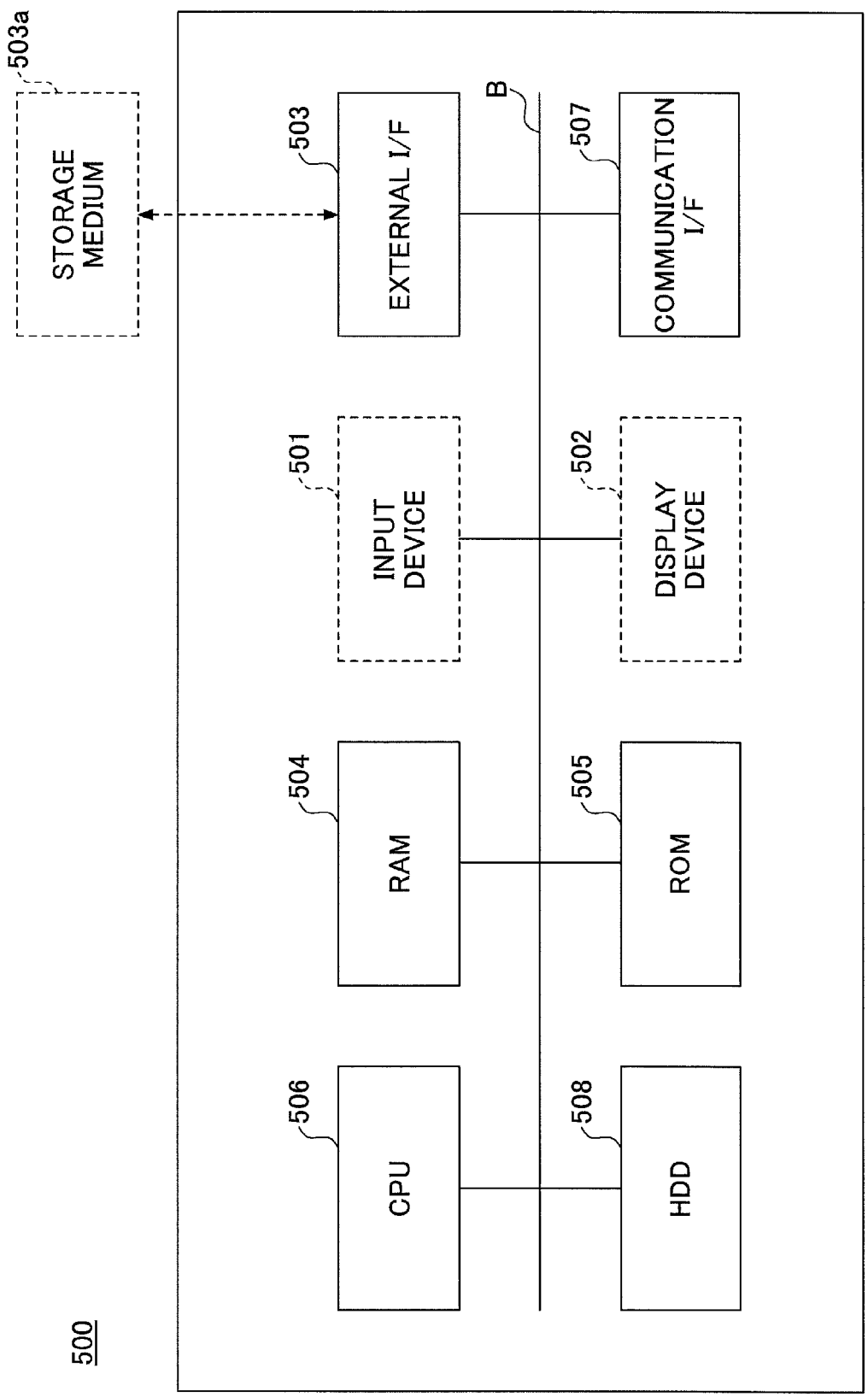
FIG. 2 illustrates an exemplary hardware configuration of a computer according to an embodiment of the present invention.

The print server apparatus 10, the authentication server apparatus 11, and the client terminal 13 may be implemented by a computer having a hardware configuration as illustrated in FIG. 2, for example. FIG. 2 is a block diagram illustrating an exemplary hardware configuration of a computer 500.

In FIG. 2, the computer 500 includes an input device 501, a display device 502, an external I/F 503, a RAM 504, a ROM 505, a CPU 506, a communication I/F 507, and a hard disk drive (HDD) 508 that are interconnected via a bus B. Note that in some embodiments, the input device 501 and the display device 502 may be connected to the computer 500 when they need to be used, for example.

The input device 501 may include a keyboard and/or a mouse, for example, and is used to input various operation signals to the computer 500. The display device 502 may include a display, for example, and is configured to display processing results of the computer 500.

The communication I/F 507 is an interface for connecting the computer 500 to the network N1. In this way, the computer 500 may establish data communication with other computers via the communication I/F 507.

The HDD 508 is a nonvolatile storage device storing programs and data. The programs stored in the HDD 508 may include an operating system (OS) corresponding to basic software controlling overall operations of the computer 500, and application software providing various functions under the control of the OS, for example.

The external I/F 503 is an interface between the computer 500 and an external device. The external device may be a storage medium 503a, for example. The computer 500 may have information read from and/or written on the storage medium 503a via the external I/F 503. Specific examples of the storage medium 503a include a flexible disk, a compact disk (CD), a digital versatile disk (DVD), a SD memory card, a universal serial bus (USB) memory, and the like.

The ROM 505 is a nonvolatile semiconductor memory (storage device) that can store programs and/or data even when the power is turned off. The ROM 505 stores programs and data such as a basic input/output system (BIOS) to be executed when the computer 500 is started, OS settings, network settings, and the like. The RAM 504 is a volatile semiconductor memory (storage device) that temporarily stores programs and/or data.

The CPU 506 includes an arithmetic and logic unit that reads a program and/or data from a storage device such as the ROM 505 and/or the HDD 508, loads the program and/or data in the RAM 504, and executes processes according to the program and/or data to control the overall operations and functions of the computer 500.

The print server apparatus 10, the authentication server apparatus 11, and the client terminal 13 of the present embodiment may implement various processes as described below using the hardware configuration of the computer 500 as illustrated in FIG. 2.

Figure 3:
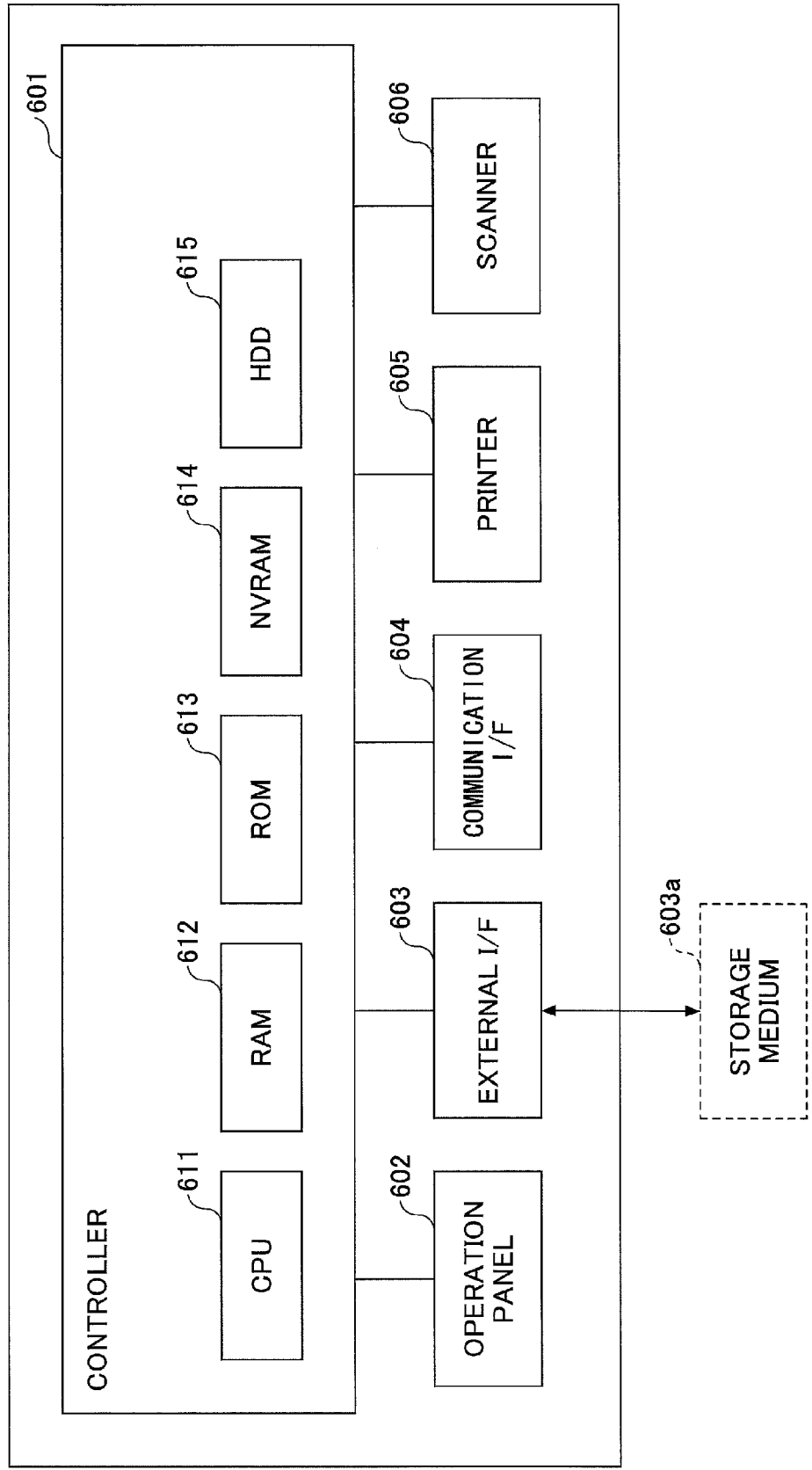
FIG. 3 illustrates an exemplary hardware configuration of an image forming apparatus according to an embodiment of the present invention.

The image forming apparatus 12 illustrated in FIG. 1 may be implemented by a hardware configuration as illustrated in FIG. 3, for example. FIG. 3 is a block diagram illustrating an exemplary hardware configuration of the image forming apparatus 12 according to the present embodiment. In FIG. 3, the image forming apparatus 12 includes a controller 601, an operation panel 602, an external I/F 603, a communication I/F 604, a printer 605, and a scanner 606, for example.

The controller 601 includes a CPU 611, a RAM 612, a ROM 613, a non-volatile RAM (NVRAM) 614, and a HDD 615. The ROM 613 stores various programs and data. The RAM 612 temporarily stores programs and/or data to be used. The NVRAM 614 may store setting information, for example. The HDD 615 stores various programs and data.

The CPU 611 controls the overall operations and functions of the image forming apparatus 12 by loading one or more of the programs, data, and setting information stored in the ROM 613, the NVRAM 614, or the HDD 615 onto the RAM 612, and executing processes accordingly, for example.

The operation panel 602 includes an input unit for receiving an operation input from a user, and a display unit for displaying information. The external I/F 603 is an interface between the image forming apparatus 12 and an external device. The external device may be a storage medium 603a, for example. The image forming apparatus 12 may perform read/write operations on the storage medium 603a via the external I/F 603, for example. The storage medium 603a may be an IC card, a flexible disk, a CD, a DVD, a SD memory card, a USB memory, or some other suitable storage medium, for example.

The communication I/F 604 is an interface for connecting the image forming apparatus 12 to the network N1. In this way, the image forming apparatus 12 may establish data communication with other apparatuses via the communication I/F 604. The printer 605 is a printing device that prints (outputs) print data on a sheet such as paper, for example. The scanner 606 is a scanning device that reads image data (electronic data) from an original document, for example.

<Software Configuration>

<<Print Server Apparatus>>

Figure 4:
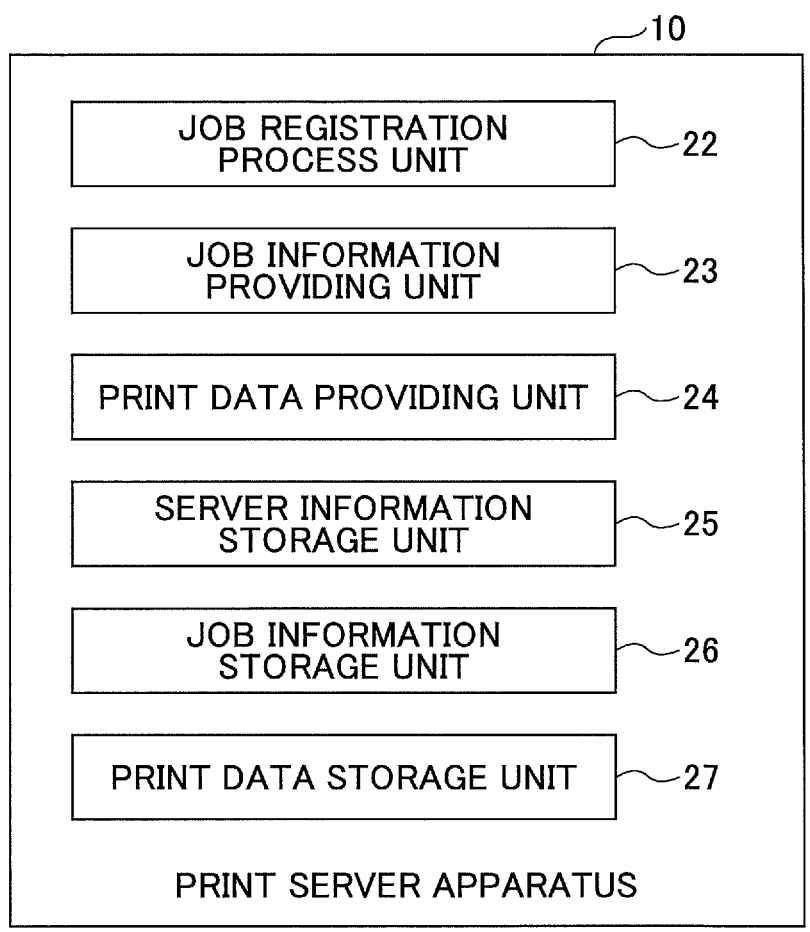
FIG. 4 illustrates an exemplary functional configuration of a print server apparatus according to an embodiment of the present invention.

The print server apparatus 10 of the present embodiment may have a functional configuration as illustrated in FIG. 4, for example. FIG. 4 is a block diagram illustrating an exemplary functional configuration of the print server apparatus 10.

The print server apparatus 10 may execute relevant programs to implement the functions of a job registration process unit 22, a job information providing unit 23, a print data providing unit 24, a server information storage unit 25, a job information storage unit 26, and a print data storage unit 27.

The job registration process unit 22 is configured to receive print jobs and perform a job registration process. The job information providing unit 23 provides print job information to the image forming apparatus 12 in response to a request from the image forming apparatus 12.

The print data providing unit 24 provides print data to the image forming apparatus 12 in response to a request from the image forming apparatus 12. The server information storage unit 25 stores server information as described in detail below. The job information storage unit 26 stores print job information. The print data storage unit 27 stores print data.

<<Image Forming Apparatus>>

Figure 5:
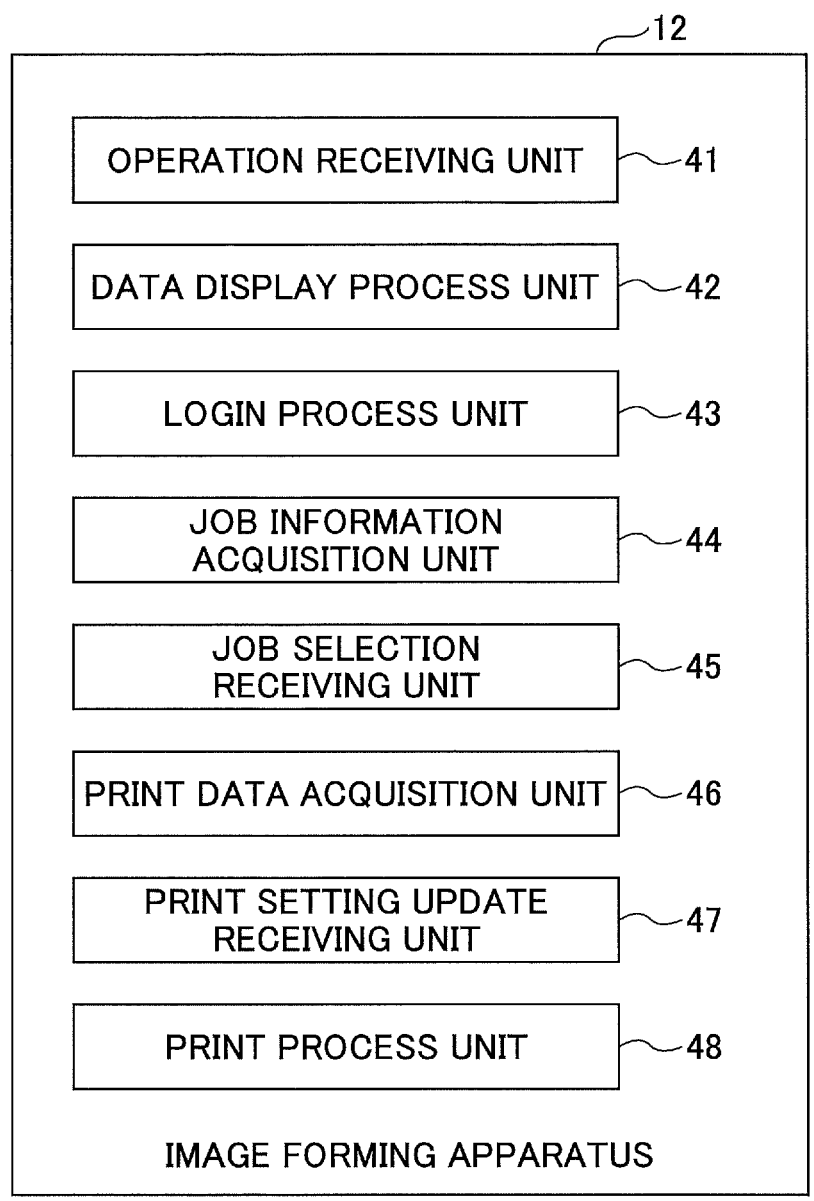
FIG. 5 illustrates an exemplary functional configuration of the image forming apparatus.

The image forming apparatus 12 according to the present embodiment may have a functional configuration as illustrated in FIG. 5, for example. FIG. 5 is a block diagram illustrating an exemplary functional configuration of the image forming apparatus 12 according to the present embodiment.

The image forming apparatus 12 may execute relevant programs to implement the functions of an operation receiving unit 41, a data display process unit 42, a login process unit 43, a job information acquisition unit 44, a job selection receiving unit 45, a print data acquisition unit 46, a print setting update receiving unit 47, and a print process unit 48.

The operation receiving unit 41 receives an operation input from the user. The data display process unit 42 displays information to the user. The login process unit 46 receives a login operation from the user and performs a login process as described below. The job information acquisition unit 44 acquires print job information from the print server apparatus 10.

The job selection receiving unit 45 receives a selection of a print job made by the user from a print job information list screen as described below. The print data acquisition unit 46 acquires print data of the selected print job from the print server apparatus 10 as described below. The print setting update receiving unit 47 updates print settings of print data upon receiving a print setting update (change) request from the user. The print process unit 48 performs a print process for printing the acquired print data according to the print settings of the print data using the printer 605.

<<Client Terminal>>

Figure 6:
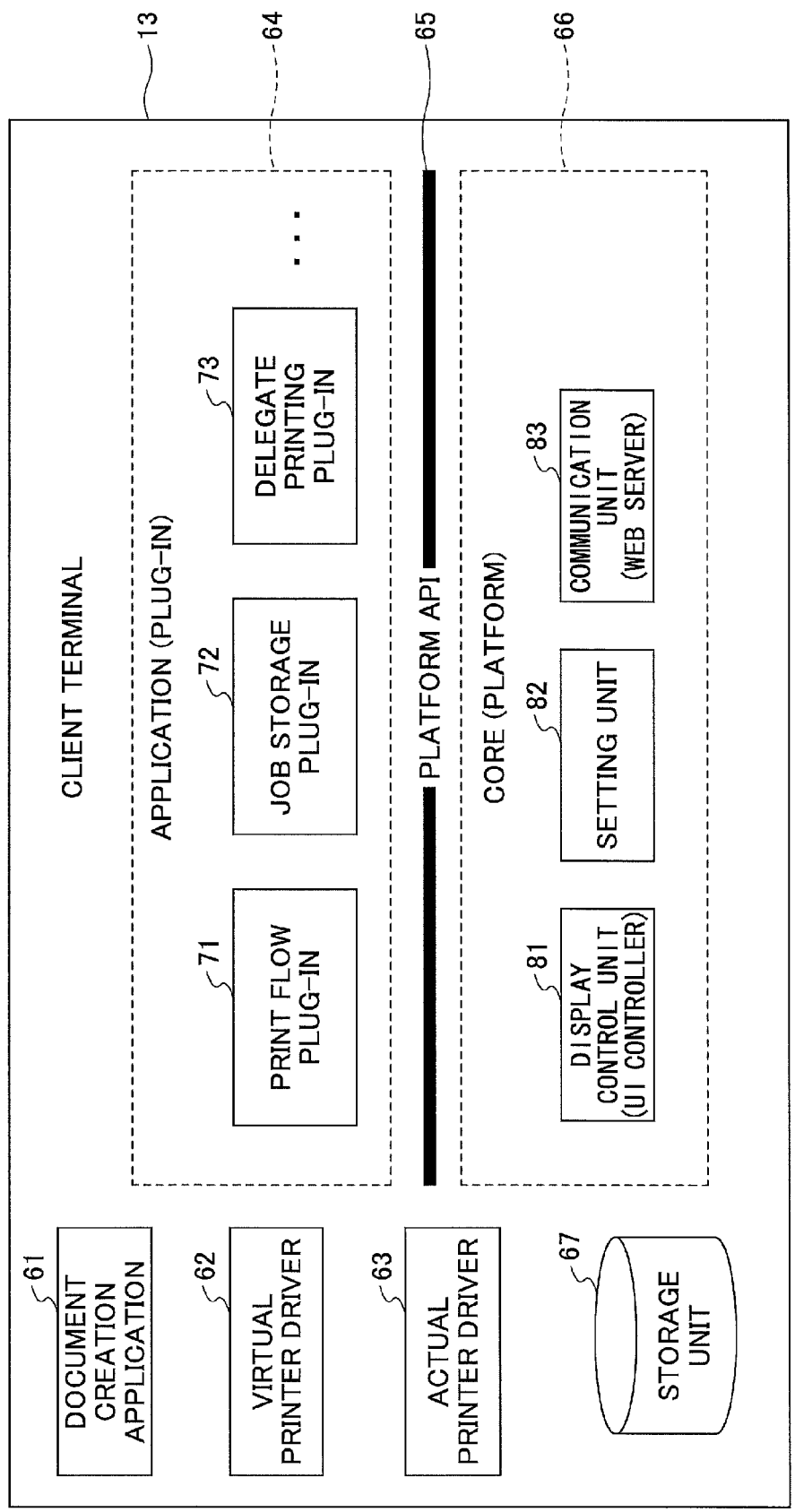
FIG. 6 illustrates an exemplary functional configuration of a client terminal according to an embodiment of the present invention.

The client terminal 13 of the present embodiment may have a functional configuration as illustrated in FIG. 6, for example. FIG. 6 is a block diagram illustrating an exemplary functional configuration of the client terminal 13.

The client terminal 13 may execute relevant programs to implement the functions of a document creation application 61, a virtual printer driver 62, an actual printer driver 63, a plug-in 64, a platform API 65, a platform 66, and a storage unit 67. The plug-in 64 includes a print flow plug-in 71, a job storage plug-in 72, and a delegate printing plug-in 73. The platform 66 includes a display control unit (UI controller) 81, a setting unit 82, and a communication unit 83.

The document creation application 61 is an example of an application that receives a print request from a user. Note that the document creation application 61 is merely one illustrative example, and the client terminal 13 may use some other application that receives an output request from the user.

The virtual printer driver 62 is a printer driver that converts application data into print data in a machine-independent intermediate format and outputs the converted print data. The print data in the intermediate format is print data that is not dependent on the specific type of the image forming apparatus 12. Print data in XPS (XML Paper Specification) format is an example of print data (output data) in the intermediate format. The application data is an example of output data.

The actual printer driver 63 is a printer driver that converts application data or print data in the intermediate format into print data in an actual format that enables the image forming apparatus 12 to print the print data. Raw format data is an example of print data (output data) in the actual format.

Note that the application data, the print data in the intermediate format, and the print data in the actual format may be regarded as output data that are configured into various data formats over a period of time from when the user issues an output request for output data until an output apparatus outputs the output data. For example, the application data may be output data in a data format compatible with the application being used.

In other words, the application data, the print data in the intermediate format, and the print data in the actual format may all be considered output data by disregarding the data formats into which the data are converted over the period of time from when an output request for output data is issued until the output data is output.

Also, note that output data of the present embodiment is not limited to print data used for printing. Other examples of output data include display data (image data) to be displayed/projected and audio data to be output. That is, any data adapted for use in one or more output processes such as printing, image display, and/or audio reproduction may be used as output data in an output system according to an embodiment of the present invention.

The plug-in 64 is software that is run on the platform 66. The plug-in 64 uses the platform API 65 to implement the functions of the platform 66. The print flow plug-in 71 of the plug-in 64 controls a print flow. The job storage plug-in 72 stores and manages print jobs. The delegate printing plug-in 73 executes processes related to delegate printing. The delegate printing plug-in 73 is used when setting up a delegate user for a print job.

The platform API 65 is an interface used by the plug-in 64 to implement the functions of the platform 66. The platform API 65 is a pre-defined interface for enabling the platform 66 to receive a request from the plug-in 64 and may be configured by classes and/or functions, for example.

The display control unit 81 of the platform 66 may control display operations of the display unit 102 in response to a request from the document creation application 61 or the plug-in 64, for example. The setting unit 82 is for setting up the plug-in 64. The communication unit 83 establishes communication with the print server apparatus 10, the authentication server apparatus 11, and the image forming apparatus 12, for example. The storage unit 67 may store settings and other relevant information, for example.

The client terminal 13 aggregates processes by aggregating functions commonly used by the plug-in 64 in the platform 66. Note that the configuration illustrated in FIG. 6 is merely one illustrative example and the applications of the client terminal 13 do not necessarily have to be configured into a hierarchical structure as illustrated in FIG. 6. Note, also, that a suitable plug-in for implementing a function desired by the user or the administrator may be installed and used as the plug-in 64. That is, the client terminal 13 does not necessarily have to include the print flow plug-in 71, the job storage plug-in 72, and the delegate printing plug-in 73 as illustrated in FIG. 6.

<<Server Information>>

FIG. 7 is a table illustrating an exemplary configuration of server information. In FIG. 7, the server information includes information items such as server ID, IP address, host name, port number, and port number (https). The server ID is identification information for uniquely identifying the print server apparatus 10 as a server. The IP address is the IP address of the server specified by the server ID.

The host name is the host name of the server specified by the server ID. The port number is the port number of the port used when communicating with the server specified by the server ID. The port number (https) is the port number of the port used when communicating with the server specified by the server ID using encryption.

For example, upon printing print data of a print job, the image forming apparatus 12 may search the server information as illustrated in FIG. 7 using a server ID included in print job information of the print job (described below) as key information to establish communication with the print server apparatus 10 storing the print data of the print job, and acquire the print data of the print job from the print server apparatus 10.

<<Print Job Information>>

FIG. 8 is a table illustrating an exemplary configuration of print job information. In FIG. 8, the print job information includes information items such as document ID, user name, user display name, server ID, job name, data storage destination, language, number of pages, print side setting, color information, and number of copies.

The document ID is identification information for uniquely identifying the print job. The user name is the name of the user that has registered the print job. The user display name is the display name of the user that has registered the print job. The server ID is the server ID of the server storing the print data of the print job. The job name is the name of the print job such as the document name of the print data. The data storage destination indicates where the print data is stored.

The language indicates the data format of the print data being stored. For example, if the language of the print job information is "XPS", this means that the print data in the intermediate format is stored. If the language is "PCL", this means that the print data in the actual format is stored. Note that print data in the intermediate format refers to print data in a format that enables easy reediting and has common format specifications open to the public. Note that the print data in the intermediate format is not limited to data in XPS format, but may be data in other formats such as PDF (Portable Document Format), for example.

On the other hand, print data in the actual format refers to print data dependent upon the image forming apparatus 12. Note that the print data in the actual format is not limited to data in PCL format, but may be data in other formats such as PS (Post Script), for example.

One of the differences in the characteristics of print data in the intermediate format and print data in the actual format lies in their capability to accommodate changes to settings relating to the output modes of print data (output data editing). Examples of settings relating to the output modes of print data include a print side setting for implementing double side printing or single side printing, a color mode for implementing color printing or black and white printing, and a combine setting for implementing "2 in 1" printing.

For example, print data in XPS format (intermediate format) can accommodate changes in the print side setting, changes in the color mode, and changes in the combine setting. On the other hand, although print data in PCL format (actual format) can accommodate changes in the print side setting and a change from color printing to black and white printing, it cannot accommodate a change from black and white printing to color printing or a change in the combine setting. Note that the capability of the print data in the intermediate format to accommodate a wider range of changes to settings relating to the output modes of print data is one aspect of the capability of the intermediate format to enable easy reediting of output data.

The number of pages represents the number of pages of the print data. The print side setting represents whether the print data is to be printed on one side or two sides of a printing sheet. The color information represents the color mode of the print data. The number of copies represents the number of copies to be printed upon printing the print data. For example, when a user makes a request to register a print job, print job information of the print job specified in the user registration request may be registered in the print job information of FIG. 8.

<Process Operations>

In the following, process operations of the print system 1 according to the present embodiment are described in greater detail.

<<Setup Process at Client Terminal>>

FIG. 9 illustrates an exemplary screen image of a setting screen 1000 displayed at the client terminal 13. The setting screen 1000 of FIG. 9 enables a user to specify settings for establishing communication with the print server apparatus 10, settings for establishing communication with the authentication server apparatus 11, and authentication settings (authentication information).

Settings for establishing communication with the print server apparatus 10 include a host name/IP address, a port number, and SSL validity (ON/OFF) information. Note that in FIG. 9, the settings for establishing connection with the print server apparatus 10 may be tested by pressing a "Connection Test" button 1002.

Settings for establishing communication with the authentication server apparatus 11 include a host name/IP address and a port number. Note that in FIG. 9, the settings for establishing connection with the authentication server apparatus 11 may be tested by pressing a "Connection Test" button 1001.

<<Delegate User Setting Process at Authentication Server Apparatus>>

The authentication server apparatus 11 may receive a delegate user setting via screens as illustrated in FIGS. 10A and 10B, for example. FIGS. 10A and 10B illustrate exemplary screens that are configured to receive delegate user settings. FIG. 10A illustrates an example of a user editing screen 1010 for performing a user editing process at the authentication server apparatus 11. FIG. 10B illustrates an example of a delegate user setting screen 1020 for performing a delegate user setting process at the authentication server apparatus 11. Note that the user editing screen 1010 of FIG. 10A and the delegate user setting screen 1020 of FIG. 10B may be displayed at the authentication server apparatus 11 or the client terminal 13 that is connected to the authentication server apparatus 11 via the network N1, for example.

The user editing screen 1010 of FIG. 10A includes entry fields for entering a login user name and a display name, and buttons for editing a password, card information, delegate user information, and authorization information. Note that the display name to be entered in the user editing screen 1010 corresponds to the user display name to be displayed at the image forming apparatus 12.

When the button 1011 for editing the delegate user information is pressed, the authentication server apparatus 11 displays the delegate user setting screen 1020 of FIG. 10B. The delegate user setting screen 1020 of FIG. 10B is for enabling a login user that has logged in via the user editing screen 1010 of FIG. 10A to set up delegate user settings for delegating a print job of the login user to a delegate user.

The delegate user setting screen 1020 of FIG. 10B illustrates an exemplary case where a login user that has logged into the authentication server apparatus 11 via the user editing screen 1010 of FIG. 10A is selecting user names "AAA" and "BBB" as delegate users that are to be delegated authorization to execute a print job of the login user corresponding to an owner of the print job. Note that information associating the owner and the delegate users set up via the user editing screen 1010 and the delegate user setting screen 1020 may be communicated from the authentication server apparatus 11 to the image forming apparatus 12 when one of the delegate users logs into the image forming apparatus 12, for example.

By providing the information associating the owner and the delegate users set up via the user editing screen 1010 and the delegate user setting screen 1020 to the image forming apparatus 12, when one of the delegates user logs into the image forming apparatus 12 as a login user, the delegate user may be able to execute (print) all the print jobs of the owner, for example.

<<Login Process at Image Forming Apparatus>>

Figure 11:
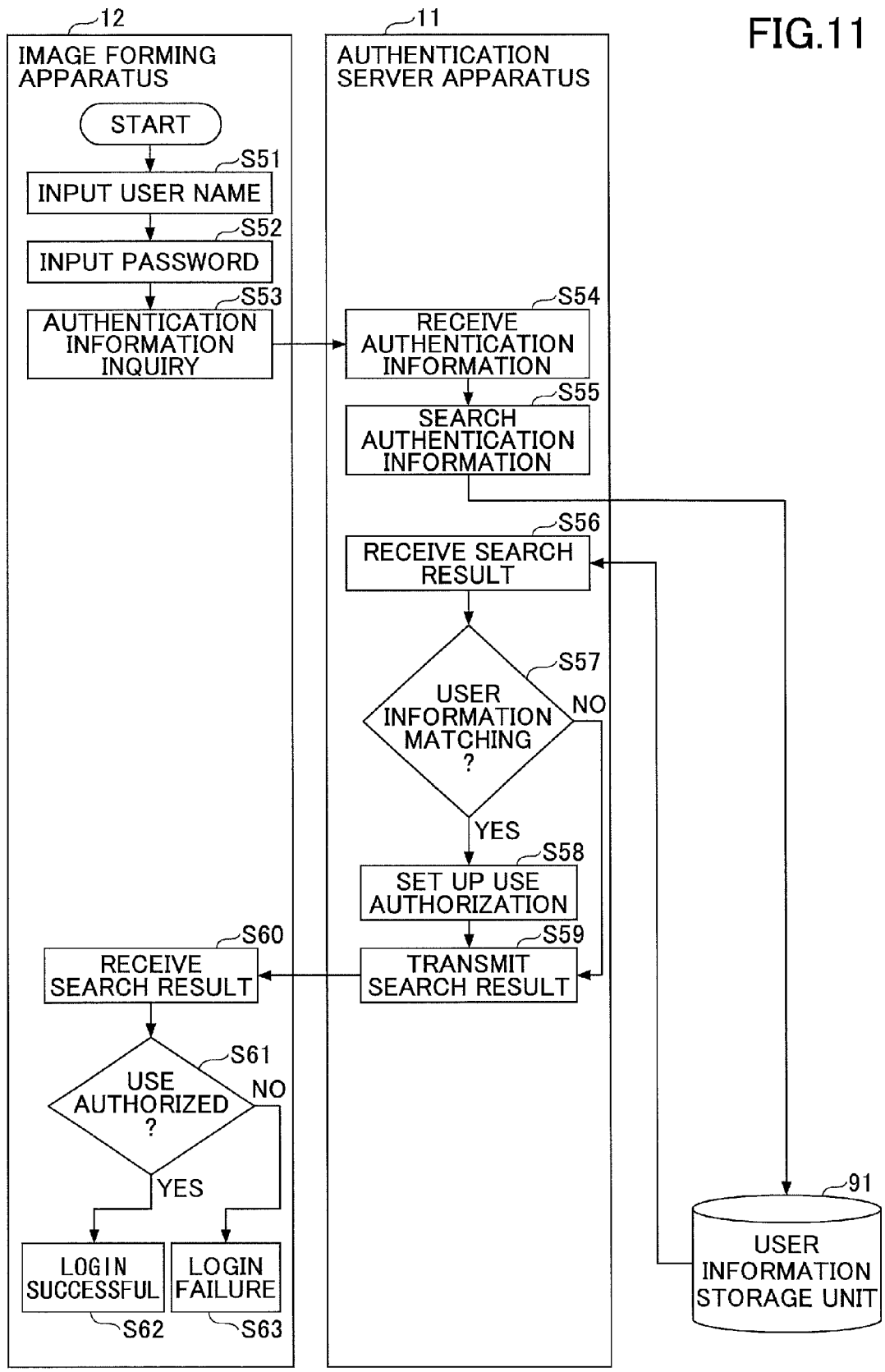
FIG. 11 is a flowchart illustrating exemplary process steps of a login process performed at the image forming apparatus.

A user may log into the image forming apparatus 12 according to the process steps as illustrated in FIG. 11, for example. FIG. 11 is a flowchart illustrating exemplary process steps of a login process performed at the image forming apparatus 12. Note that in the following descriptions, it is assumed that an owner has already stored (registered) a print job in the print server apparatus 10, and the user logging into the image forming apparatus 12 (login user) is a delegate user designated by the owner. For example, the owner may start a print job storage process by operating the document creation application 61 to open a print setting screen and selecting the virtual printer driver 62 to issue a print request. When the owner selects the virtual print driver 62 and issues the print request, the client terminal 13 may store the print job in the print server apparatus 10.

To start the login process, the user may make a request to have a login screen displayed by operating the operation panel 602 of the image forming apparatus 12, for example. The operation receiving unit 41 of the image forming apparatus 12 receives the user operation and prompts the data display process unit 42 to display the login screen.

In step S51, the operation receiving unit 41 receives a user name that is input to the login screen by the user. Also, in step S52, the operation receiving unit 41 receives a password that is input to the login screen by the user. The user name and the password are examples of authentication information of the user. In step S53, the login process unit 43 transmits the user name and the password input via the login screen as authentication information to the authentication server apparatus 11 and makes an inquiry regarding the authentication information.

In step S54, the authentication server apparatus 11 receives the authentication information from the image forming apparatus 12. In step S55, the authentication server apparatus 11 requests a user information storage unit 91 to search for the authentication information received from the image forming apparatus 12. The user information storage unit 91 stores authentication information of authorized users. The user information storage unit 91 searches the authentication information of authorized users to determine whether the authentication information received from the image forming apparatus 12 is included therein, and transmits the search result to the authentication server apparatus 11.

In step S56, the authentication server apparatus 11 receives the search result from the user information storage unit 91. In step S57, the authentication server apparatus 11 determines whether the authentication information stored in the user information storage unit 91 includes authentication information matching that received from the image forming apparatus 12.

If there is a match between the authentication information received from the image forming apparatus 12 and the authentication information stored in the user information storage unit 91, in step S58, the authentication server apparatus 11 sets up use authorization of the user to allow use of the image forming apparatus 12. Then, in step S59, the authentication server apparatus 11 transmits a success notification and the use authorization information set up for the user to the image forming apparatus 12.

If there is no match between the authentication information received from the image forming apparatus 12 and the authentication information stored in the user information storage unit 91, in step S59, the authentication server apparatus 11 transmits a failure notification to the image forming apparatus 12.

In step S60, the login process unit 43 of the image forming apparatus 12 receives a result of the inquiry regarding the authentication information from the authentication server apparatus 11. Note that the information associating the owner and the delegates user set up via the user editing screen 1010 and the delegate user setting screen 1020 may be communicated from the authentication server apparatus 11 to the image forming apparatus 12 in step S60, for example.

In step S61, the login process unit 43 of the image forming apparatus 12 determines whether it has received from the authentication server apparatus 11 use authorization information as part of the result of the inquiry regarding the authentication information. If it is determined that use authorization information has been received, the login process unit 43 allows successful login of the user in step S62. Through successful login, the user may be able to use applications and functions of the image forming apparatus 12 within the scope of the use authorization set up for the user. If it is determined that use authorization information has not been received from the authentication server apparatus 11, the login process unit 43 may indicate on the operation panel 602 that the login process ended in failure, for example.

Note that although a user name and a password are used as authentication information in the login process illustrated in FIG. 11, the login process may be performed using other types of information such as IC card registration information, for example. In the case of using IC card registration information in the login process, for example, IC card registration information may be pre-registered in association with a user name or some other form of user identification information in the user information storage unit 91. When IC card registration information that is not associated with user identification information is used in the login process, the login process may involve accepting a process of registering IC card registration information in association with user identification information such as a user name from the image forming apparatus 12, for example.

Figure 12:
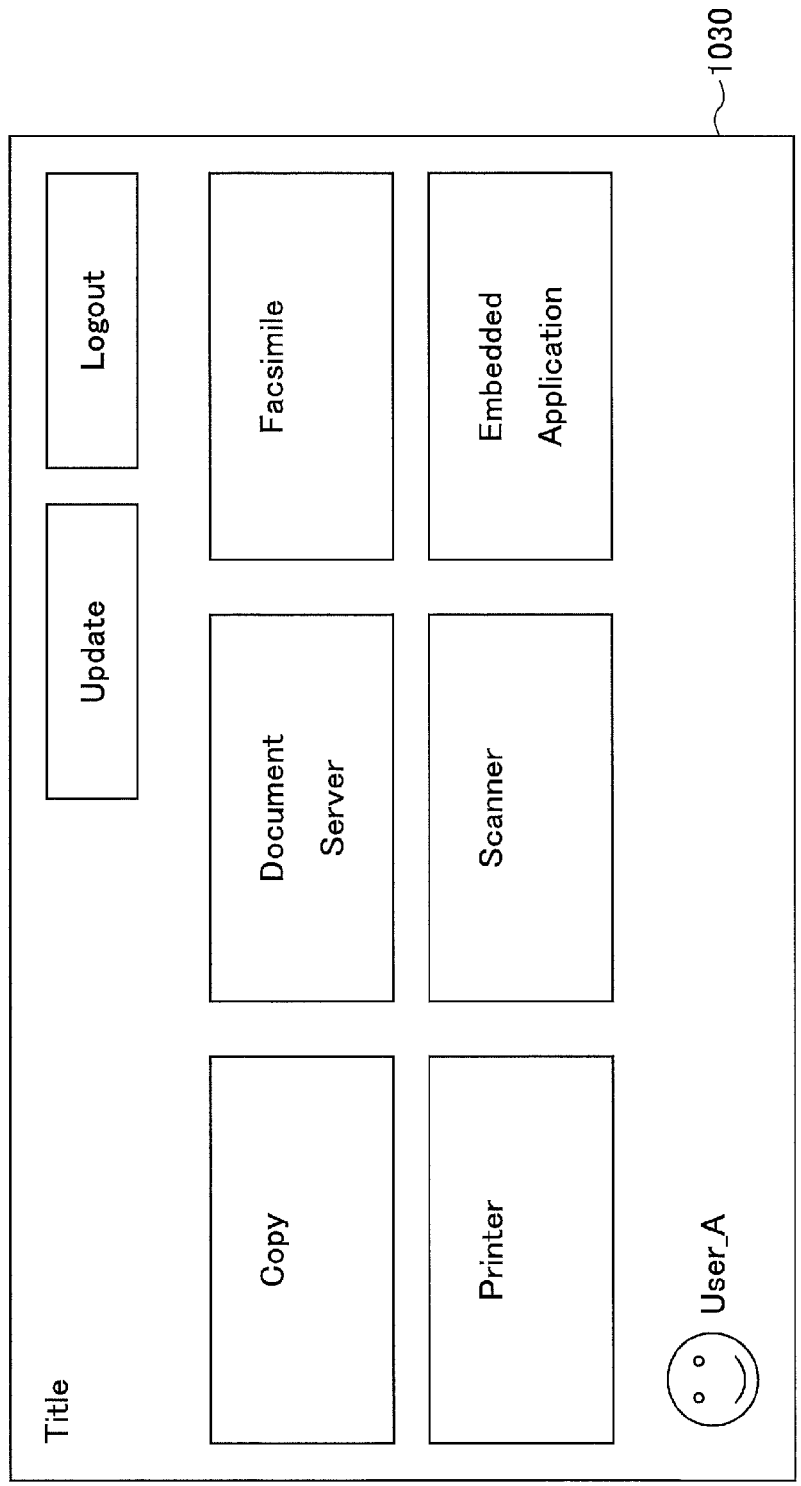
FIG. 12 illustrates an exemplary home screen displayed after a user successfully logs in at the image forming apparatus.

If login is successful, the data display process unit 42 of the image forming apparatus 12 may display on the operation panel 602 a home screen 1030 as illustrated in FIG. 12, for example. FIG. 12 illustrates an exemplary screen image of a home screen that may be displayed at the image forming apparatus 12 after successful login. The home screen 1030 of FIG. 12 displays link buttons to applications such as a copier, a printer, a document server, a scanner, and a facsimile to enable easy access to these applications.

Also, the home screen 1030 of FIG. 12 displays an "Update" button and a "Logout" button to enable the user to smoothly update a screen or logout, for example. Further, the home screen 1030 of FIG. 12 includes an "Embedded Application" link button for enabling the user to set up links to applications other than the above basic applications. Note that the home screen 1030 of FIG. 12 is merely one illustrative example of a home screen, and the layout of the home screen may vary depending on the use authorization of the user and may be changed through user operations, for example.

<<Print Job Information List Screen>>

By pressing the link button to the printer application displayed on the home screen 1030, for example, the login user may make a request to the image forming apparatus 12 to display a print job information list screen. In response to such a request, the job information acquisition unit 44 of the image forming apparatus 12 makes a request to the print server apparatus 10 for print job information of the user that has successfully logged in. The job information providing unit 23 of the print server apparatus 10 searches for print job information associated with the user name of the user that has successfully logged in.

The job information providing unit 23 also acquires the server ID that is set up in the print job information of the user, and searches for server information associated with the acquired server ID. The job information providing unit 23 transmits the print job information of the user and the server information associated with the acquired server ID to the image forming apparatus 12.

The job information acquisition unit 44 of the image forming apparatus 12 receives from the print server apparatus 10 the print job information of the user that has successfully logged in and the server information associated with the server ID that is set up in the print job information of the user. The data display process unit 42 of the image forming apparatus 12 uses the received print job information of the user and the server information associated with the server ID set up in the print job information of the user to display a print job information list screen as illustrated in FIG. 13, for example.

Figure 13:
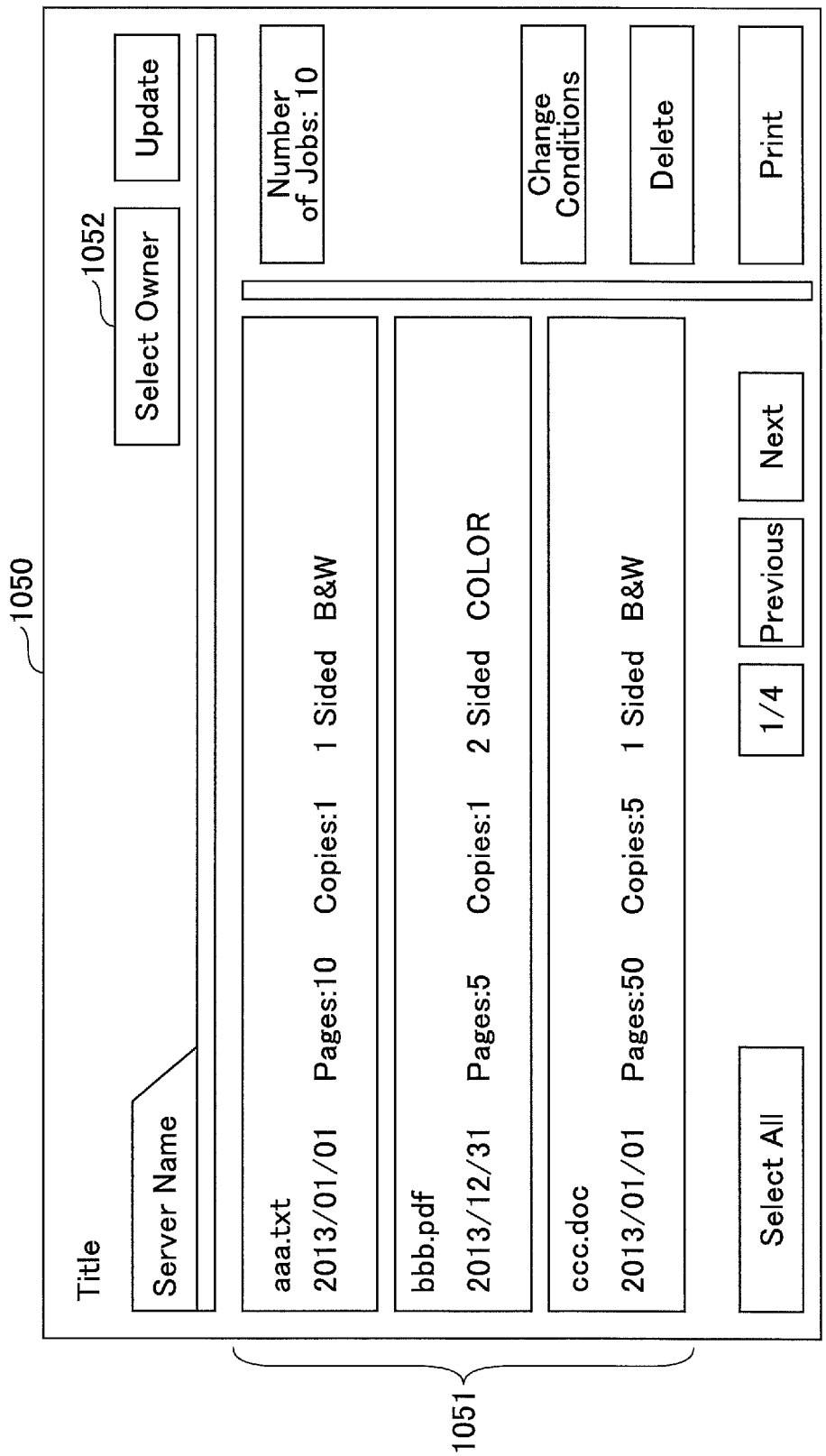
FIG. 13 illustrates an exemplary print job information list screen.

FIG. 13 illustrates an exemplary screen image of a print job information list screen 1050. The print job list screen 1050 of FIG. 13 includes a print job information list 1051 indicating the print job information of the user who has successfully logged in. The print job information of each print job included in the print job information list 1051 is represented by a selectable component such as a button. Note that in the example of FIG. 13, each of the selectable components representing the print job information of the user indicates the document name of the print data, the date the print job storage process was executed, the number of pages, the number of copies, the print side setting, and the color information.

Also, the print job information list screen 1050 of FIG. 13 includes a "Select All" button, a "Select Owner" button 1052, an "Update" button, a "Change Conditions" button, a "Delete" button, and a "Print" button. Further, the print job information list screen 1050 of FIG. 13 displays the number of print jobs stored by the user that has successfully logged in.

The "Select All" button is a button for selecting all the print job information included in the print job information list 1051. The "Select Owner" button 1052 is a button for prompting the operation panel 602 to display an owner selection screen as described in detail below. The "Update" button is a button for updating the print job information list 1051. When the "Update" button is pressed, the job information acquisition unit 44 reacquires the print job information and the server information from the print server apparatus 10.

The "Change Conditions" button is a button for displaying a print setting change screen for changing the print settings of the print job information that is currently selected. The "Delete" button is a button for deleting the print job information that is currently selected. The "Print" button is a button for issuing a print instruction for the print job information that is currently selected.

<<Owner Print Job Information List Screen>>

The login user may request the image forming apparatus 12 to display an owner selection screen by pressing the "Select Owner" button 1052 displayed on the print job information list screen 1050, for example. When the owner selection screen is displayed at the image forming apparatus 12, the login user may select an owner from the owner selection screen to prompt the print job information list screen to display a list of print job information of print jobs delegated to the login user by the selected owner.

Figure 14:
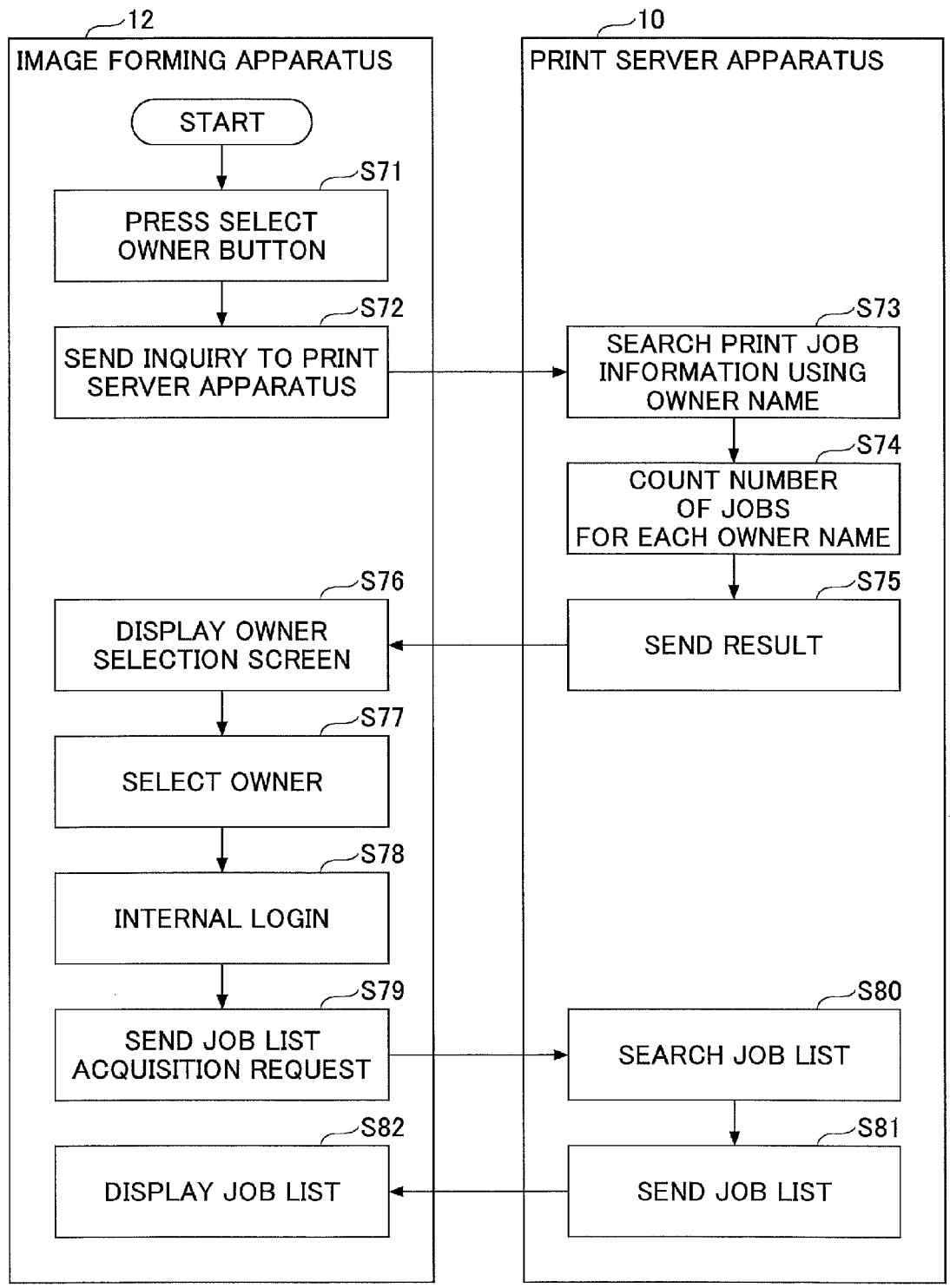
FIG. 14 is a flowchart illustrating exemplary process steps of a process for displaying a print job information list screen including print job information of an owner.

FIG. 14 is a flowchart illustrating an exemplary process of displaying the print job information list screen including a print job information list of print jobs that are delegated to the login user by the selected owner.

In step S71, the operation receiving unit 41 of the image forming apparatus 12 receives an operation input corresponding to the login user pressing the "Select Owner" button 1052. In step S72, the job information acquisition unit 44 makes an inquiry to the print server apparatus 10 regarding the number of print jobs that are delegated to the login user. Note that in step S72, the job information acquisition unit 44 may make an inquiry regarding the number of print jobs of a plurality of owners that have designated the login user as a delegate user.

Figures 15, 16:
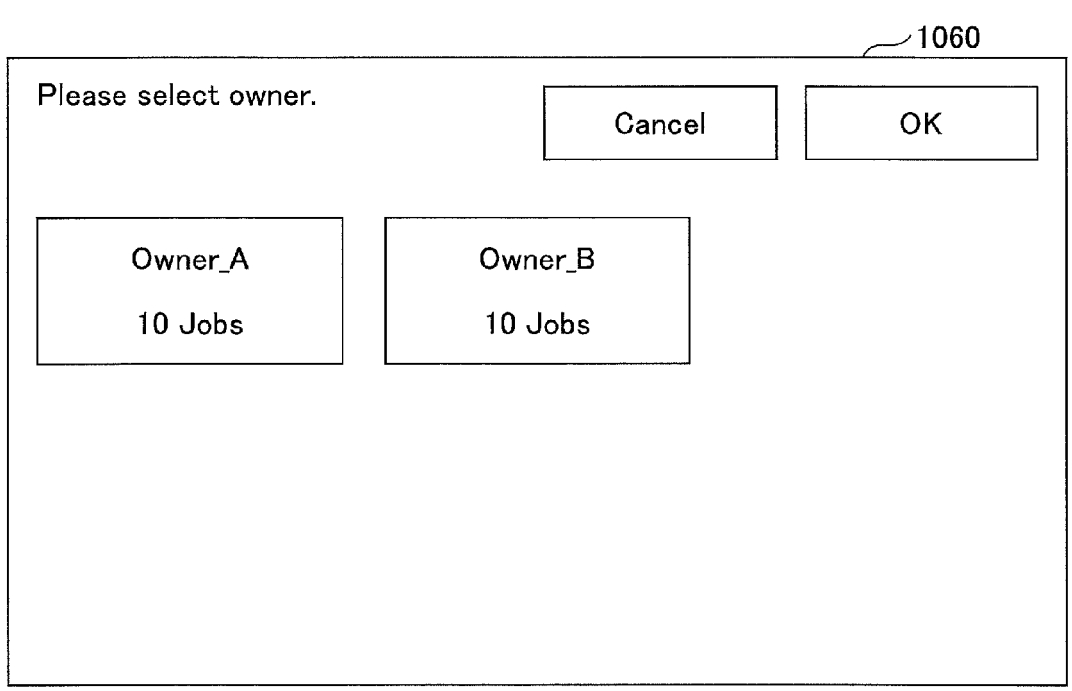
FIG. 15 illustrates exemplary inquiry information sent to the print server apparatus to inquire about the number of print jobs registered by an owner.
FIG. 16 illustrates an exemplary owner selection screen.

FIG. 15 illustrates an example of inquiry information sent to the print server apparatus 10 to inquire about the number of print jobs of one or more owners. The inquiry information of FIG. 15 represents an exemplary case where "Owner_A" and "Owner_B" have delegated authority to the login user to execute their print jobs. By sending the above inquiry information to the print server apparatus 10, the print server apparatus 10 may be notified of the user names of the owners that have designated the login user as a delegate user.

In step S73, the job information providing unit 23 of the print server apparatus 10 searches the print job information stored in the print job information storage unit 26 using the user names of the owners. In step S74, the job information providing unit 23 counts the number of print jobs associated with each user name of each owner based on the result of the above search.

In step S75, the job information providing unit 23 communicates the result of counting the number of print jobs associated with each user name of each owner to the image forming apparatus 12 as a response to the inquiry made in step S72.

In step S76, the data display process unit 42 of the image forming apparatus 12 displays on the operation panel 602 an owner selection screen 1060 as illustrated in FIG. 16, for example, based on the result of counting the number of print jobs associated with each user name of each owner received from the print server apparatus 10.

FIG. 16 illustrates an exemplary screen image of the owner selection screen 1060. The owner selection screen 1060 of FIG. 16 displays selectable components such as buttons that represent owner information of selectable owners. In the illustrated example, each of the selectable components representing the owner information indicates the user display name of the owner that has designated the login user as a delegate user and the number of print jobs of the owner having the login user designated as a delegate user (count result of counting the print jobs associated with the user name of the owner).

Also, the owner selection screen 1060 of FIG. 16 includes a "Cancel" button for requesting the execution of a cancelling process and closing the owner selection screen 1060, and an "OK" button for displaying a print job information list screen including the list of print job information of print jobs of the owner selected by the login user.

In step S77, the login user selects an owner from the owner selection screen 1060 of FIG. 16, for example, and presses the "OK" button. In step S78, the job information acquisition unit 44 of the image forming apparatus 12 performs internal login using authentication settings of the owner selected from the owner selection screen 1060. Note that it is assumed in the present example that information required for performing the internal login is acquired from the authentication server apparatus 11 during the above-described login process.

In step S79, the job information acquisition unit 44 of the image forming apparatus 12 sends an acquisition request to the print server apparatus 10 for print job information of the owner that has been selected from the owner selection screen 1060 of FIG. 16. In step S80, the job information providing unit 23 of the print server apparatus 10 searches for print job information associated with the user name of the selected owner.

The job information providing unit 23 also acquires the server ID included in the print job information acquired from the above search, and searches for server information associated with the acquired server ID. In step S81, the job information providing unit 23 sends the acquired print job information and the server information to the image forming apparatus 12.

The job information acquisition unit 44 of the image forming apparatus 12 receives from the print server apparatus 10 the print job information of the selected owner and the server information associated with the server ID included in the above print job information. In step S82, the data display process unit 42 of the image forming apparatus 12 displays on the operation panel 602 a print job information list screen 1070 as illustrated in FIG. 17, for example, based on the received print job information of the selected owner and the server information associated with the server ID included in the print job information.

Figure 17:
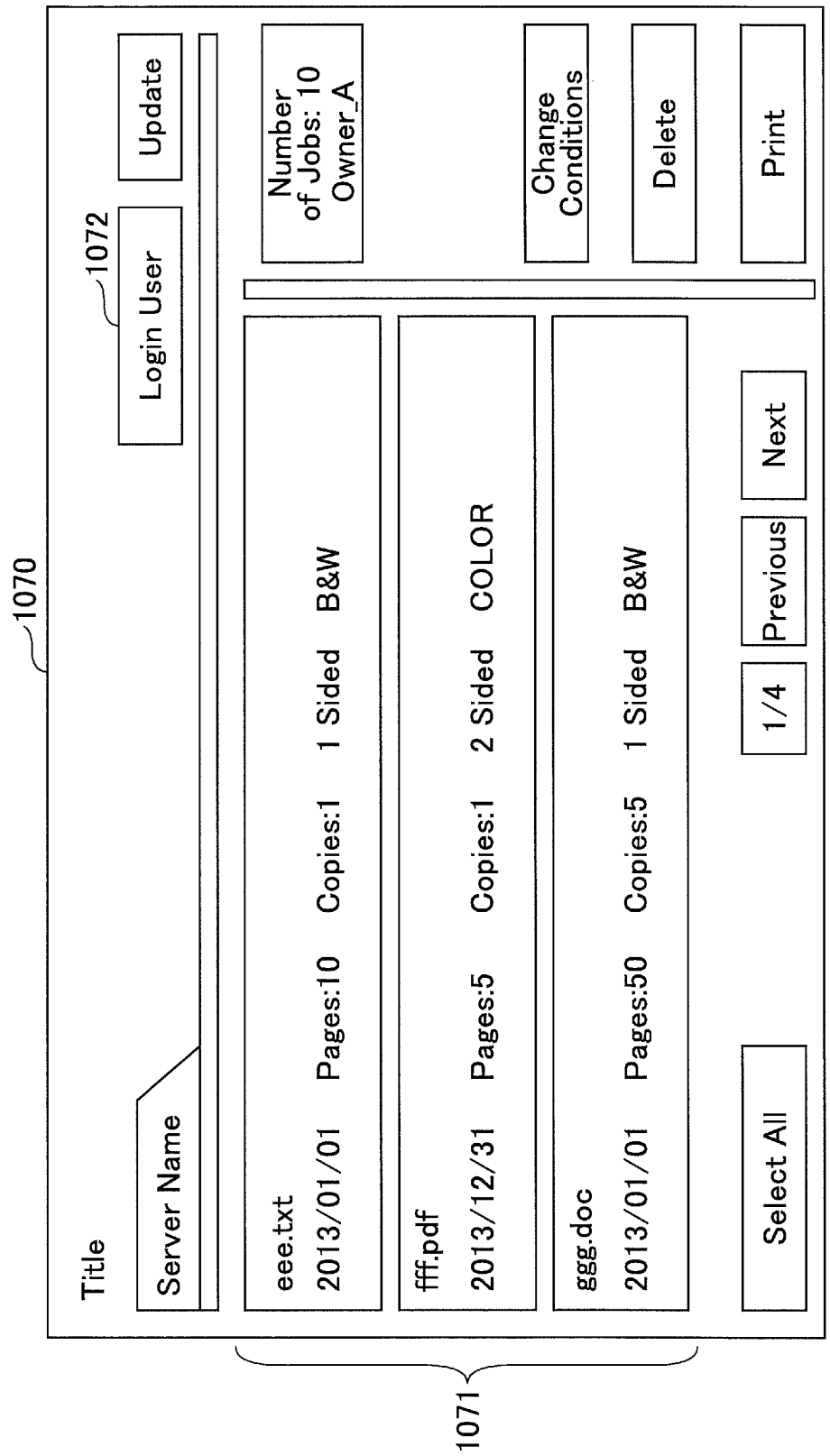
FIG. 17 illustrates another example of a print job information list screen.

FIG. 17 illustrates another exemplary print job information list screen. The print job information list screen 1070 of FIG. 17 includes a print job information list 1071 including print job information of print jobs of the selected owner. The print job information list screen 1070 of FIG. 17 differs from the print job information list screen 1050 of FIG. 13 in that it includes a "Login User" button 1072 instead of the "Select Owner" button 1052 and indicates the user display name of the selected owner rather than the user display name of the login user.

The "Login User" button 1072 is a button for switching the screen display to the print job information list screen 1050 of FIG. 13. The login user may use the "Select Owner" button 1052 of FIG. 13 and the "Login User" button 1072 of FIG. 17 to easily switch displays between the print job information of the login user and the print job information of a selected owner.

By implementing the process of FIG. 14, the login user may easily prompt the image forming apparatus 12 to display the print job information list 1071 indicating print job information of print jobs delegated to the login user by a selected owner, and the login user may thus easily direct the image forming apparatus 12 to execute a print job selected from the print job information list 1071, for example. Also, the owner may set up delegate user settings in advance to delegate all print jobs registered by the owner to a delegate user, and in this way, procedures for settings up delegate printing may be simplified, for example.

<<Print Job Output Process>>

The login user may make a request to the image forming apparatus 12 to perform a print job output process by selecting the desired print job information from the print job information list 1051 and pressing the "Print" button of the print job information list screen 1050 of FIG. 13, for example. Also, the login user may make a request to the image forming apparatus 12 to perform a print job output process by selecting the desired print job information from the print job information list 1071 and pressing the "Print" button of the print job information list screen 1070 of FIG. 17, for example.

Figure 18:
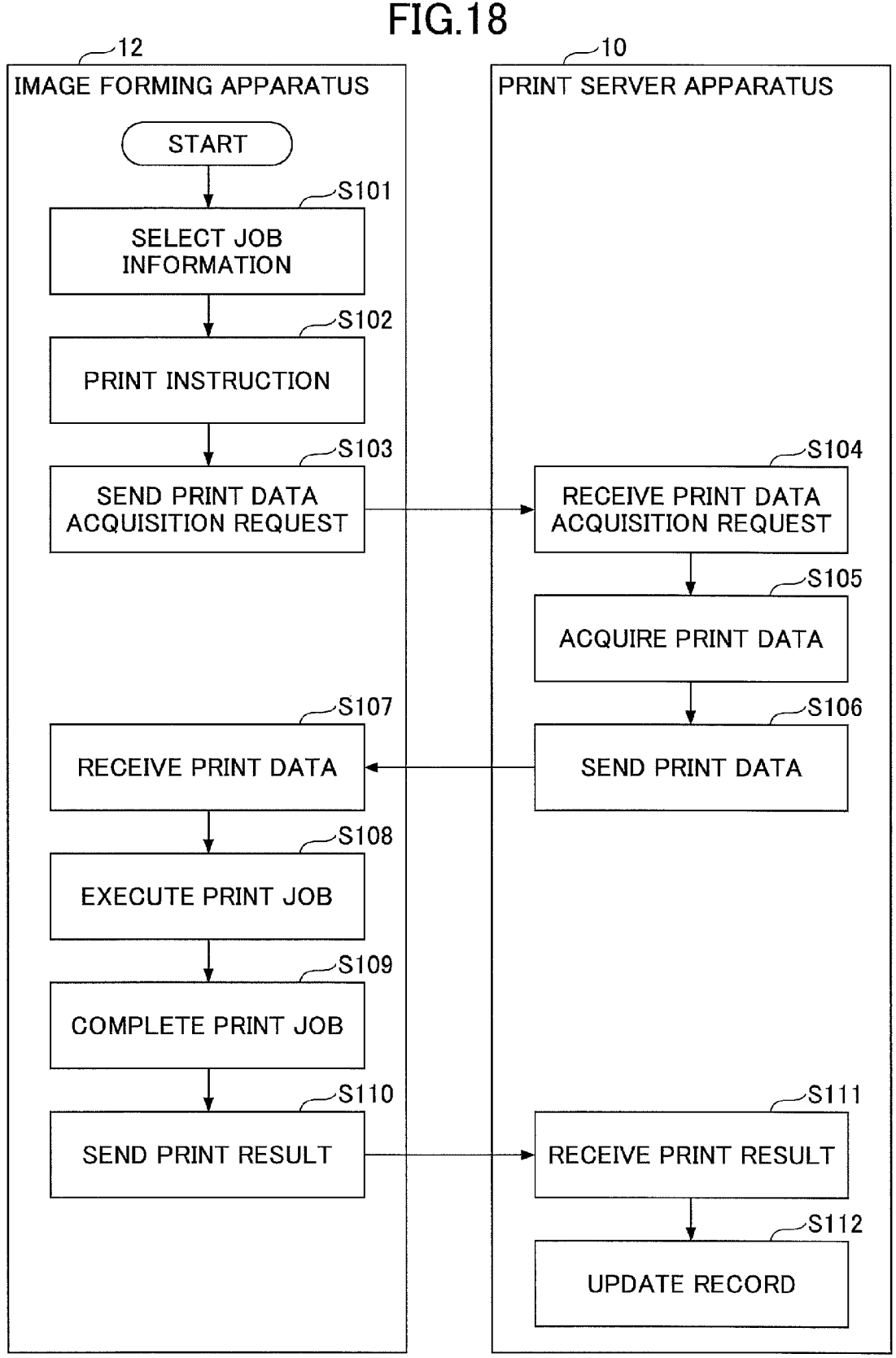
FIG. 18 is a flowchart illustrating exemplary process steps of a print job output process according to an embodiment of the present invention.

FIG. 18 is a flowchart illustrating exemplary process steps of a print job output process according to the present embodiment. In step S101, the job selection receiving unit 45 of the image forming apparatus 12 receives a selection of print job information made by the user from the print job information list 1071 of the print job information list screen 1070 of FIG. 17, for example.

In step S102, when the user presses the "Print" button of the print job information list screen 1070, the job selection receiving unit 45 receives a print instruction to print the print data of the print job information selected in step S101. In step S103, the print data acquisition unit 46 sends a print data acquisition request to the print server apparatus 10 to acquire the print data of the print job information for which the print instruction has been issued.

In step S104, the print server apparatus 10 receives the print data acquisition request from the image forming apparatus 12. In step S105, the print data providing unit 24 of the print server apparatus 10 acquires from the print data storage unit 27 print data in the actual format according to the print data acquisition request from the image forming apparatus 12. In step S106, the print data providing unit 24 sends the print data in the actual format to the image forming apparatus 12 corresponding to the sender of the print data acquisition request.

In step S107, the image forming apparatus 12 receives the print data in the actual format from the print server apparatus 10. In step S108, the print process unit 48 of the image forming apparatus 12 executes a print process for printing the received print data in the actual format. In step S109, the print process unit 48 completes the print process.

In step S110, the print process unit 48 starts a transmission process for transmitting a print result of printing the print data in the actual format. In step S111, the print server apparatus 10 receives the print result of printing the print data. In step S112, the job registration process unit 22 of the print server apparatus 10 performs processes such as deleting the print data and updating the print job information based on the received print result. Also, the print server apparatus 10 stores the print result in an internal storage unit or an external storage device as an accounting log.

According to an aspect of the present embodiment, even when a delegate user selects a print job of an owner and executes the print job, because the image forming apparatus 12 performs internal login using authentication settings of the owner, an account of the print job managed by the print server apparatus 10 may indicate that the owner of the print job has executed the print job. That is, even when a delegate user executes a print job on behalf of the owner of the print job, the owner of the print job is regarded as the one that has executed the print job.

In recent years, there has been a growing demand for a function of collecting and counting print accounting logs of print results in order to keep track of the amount of resources used by each user (e.g. the number of printing sheets used by each user). When implementing such a function, an accounting log of a print job executed by a delegate user on behalf of the owner of the print job may be counted as an accounting log of the owner of the print job so that the accounting logs may be managed based on the amount of resources that each user actually uses, for example.

As illustrated in FIG. 18, the image forming apparatus 12 of the print system 1 of the present embodiment can acquire and output print data stored in the print server apparatus 10.

Figure 19:
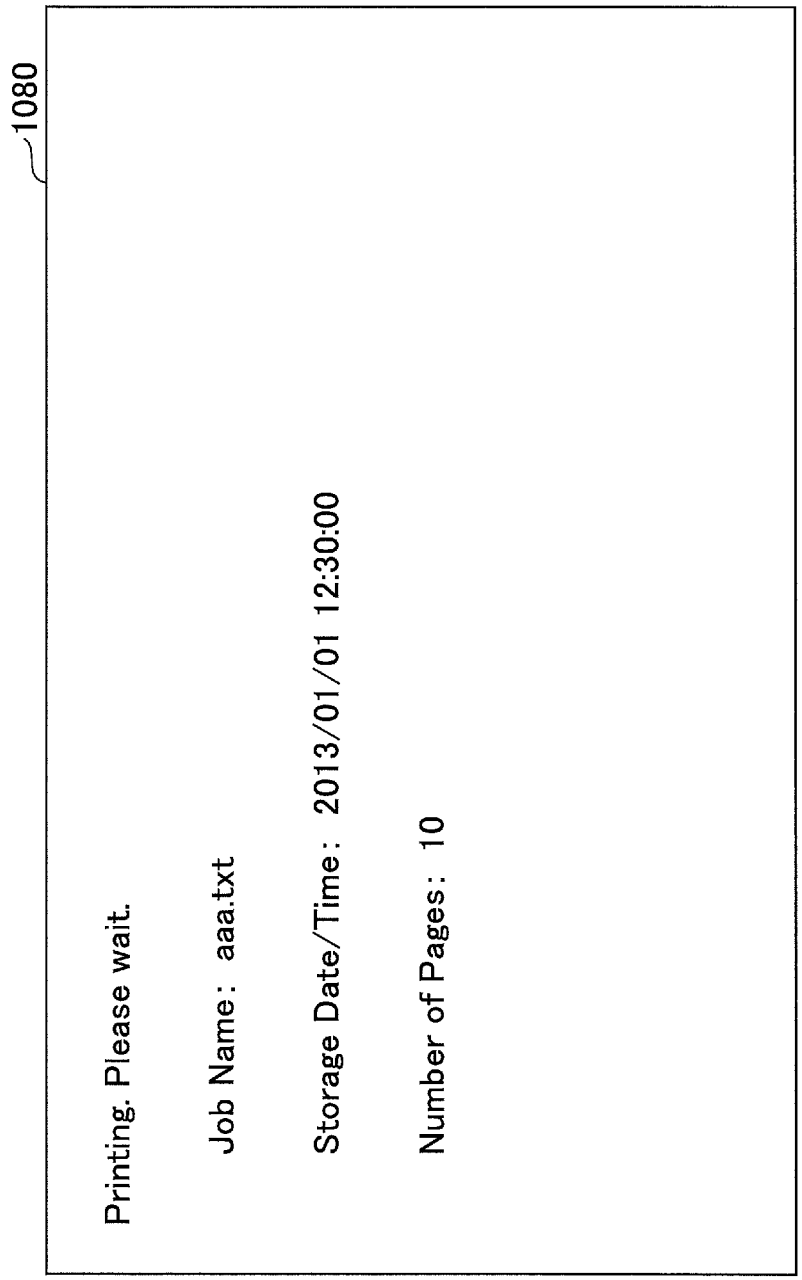
FIG. 19 illustrates an exemplary screen displayed when printing is in progress.

Note that after receiving the print instruction for the selected print job information in step S102, the data display process unit 42 of the image forming apparatus 12 may display on the operation panel 602 a screen indicating that printing is in progress as illustrated in FIG. 19, for example.

FIG. 19 illustrates an exemplary screen image of a printing screen 1080. The printing screen 1080 of FIG. 19 includes information such as the document name of the print data, the storage date/time of the print data, and the number of pages of the print data so that the user may be able to check details of the print job being executed.

Figure 20:
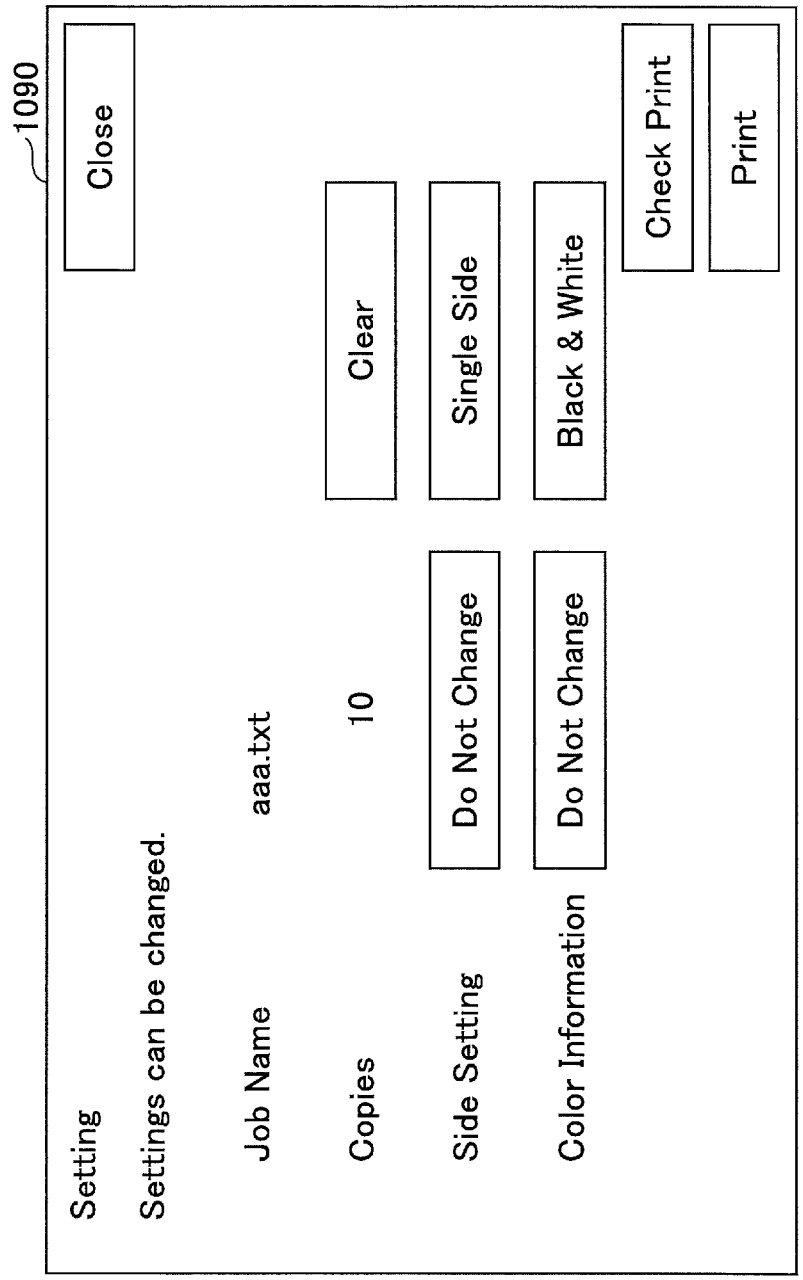
FIG. 20 illustrates an exemplary print setting change screen.

When the "Change Conditions" button of the print job information list screen 1070 of FIG. 17 is pressed, for example, a print setting change screen as illustrated in FIG. 20 may be displayed on the operation panel 602 of the image forming apparatus 12, for example. FIG. 20 illustrates an exemplary screen image of a print setting change screen 1090.

The print setting change screen 1090 of FIG. 20 indicates print settings that can be changed in the print job information selected at the time the "Change Conditions" button is pressed. In the print setting change screen 1090 of FIG. 20, the number of copies, the print side setting, and the color information are indicated as examples of print settings that can be changed.

In the print setting change screen 1090 of FIG. 20, the print side setting may be left as is, or changed to single side printing. Also, in the print setting change screen 1090 of FIG. 20, the color information may be left as is or changed to black and white printing. The print setting change screen 1090 of FIG. 20 also includes a "Check Print" button and a "Print" button.

The "Check Print" button is a button for printing one copy of the print data for checking the output. The "Print" button is a button for starting the print process using the print settings displayed on the print setting change screen 1090. When the "Print" button is pressed, the image forming apparatus 12 starts outputting the print data using the print settings displayed on the print setting change screen 1090.

Note that in the print system 1 of the present embodiment, print data in the actual format is stored in the print server apparatus 10. Print data in the actual format can accommodate fewer changes to print settings compared to print data in the intermediate format. Accordingly, in some embodiments, the print server apparatus 10 of the print system 1 may be configured to store print data in the intermediate format in order to accept changes to a wider range of print settings including changes to print settings relating to stapling and punching, for example.

In this case, the print system 1 of the present embodiment may display a print setting change screen that can accept changes to print settings relating to stapling and punching, for example, when print job information of print data in the intermediate format is selected.

Note, also, that in the print system 1 of the present embodiment, an account of a print job executed (output) by a delegate user is counted as an account of the owner of the print job.

According to an aspect of the print system 1 of the present embodiment, an owner may easily set up a delegate user that is given authorization to execute all print jobs registered by the owner, for example.

Second Embodiment

In the print system 1 according to the first embodiment, an owner sets up a delegate user that is given authorization to execute all print jobs of the owner. On the other hand, in a print system 1 according to a second embodiment, an owner sets up a delegate user with respect to each print job. Note that in the following, descriptions of features of the second embodiment that may be identical to those of the first embodiment may be omitted.

The system configuration, the hardware configuration, and the software configuration of the print system 1 according to the second embodiment may be substantially identical to those of the first embodiment. However, in the second embodiment, the print job information may have a configuration as illustrated in FIG. 21, for example. FIG. 21 illustrates an exemplary configuration of print job information used in the second embodiment. The print job information of FIG. 21 includes the information item "print delegates" in addition to the information items of the print job information illustrated in FIG. 8. The item "print delegates" indicates information on one or more delegate users that are given authorization to execute a relevant print job. For example, the user ID of the delegate users may be set up as information representing the print delegates.

When a user (owner) makes a request to register a print job, print job information of the relevant print job may be registered in the print job information of FIG. 21.

<Process Operations>

In the following, process operations of the print system 1 according to the present embodiment are described. Note that the print system 1 according to the present embodiment may perform processes substantially identical to the above-described setting process at the client terminal 13, the login process at the image forming apparatus 12, the process of displaying the print job information list screen 1050, and the print job output process of the first embodiment.

<<Delegate User Setting Process at Client Terminal>>

To start a print job storage process at the client terminal 13, an owner may operate the document creation application 61 to open a print setting screen, and select the virtual printer driver 62 to issue a print instruction, for example. When the owner selects the virtual print driver 62 and makes a print request, the client terminal 13 may prompt the display device 502 to display a delegate print accepting screen 1100 as illustrated in FIG. 22, for example.

FIG. 22 illustrates an exemplary screen image of the delegate print accepting screen 1100. A login user (owner) that has logged into the client terminal 13 may designate whether to perform delegate printing from the delegate print accepting screen 1100 of FIG. 22, for example. When the login user selects "Perform delegate printing" from the delegate print accepting screen 1100, the delegate printing plug-in 73 of the client terminal 13 may prompt the display device 502 to display a delegate user setting screen 1110 as illustrated in FIG. 23, for example.

FIG. 23 illustrates an exemplary screen image of the delegate user setting screen 1110. The delegate user setting screen 1110 of FIG. 23 is an example of a screen for executing a delegate user setting process at the client terminal 13. For example, the login user corresponding to the owner of the print job subject to the present print job storage process may select a delegate user that is to be given authorization to execute the print job from the delegate user setting screen 1110. The delegate user setting screen 1110 of FIG. 23 illustrates an exemplary case in which the login user corresponding to the owner of the print job subject to the print job storage process selects users with the user names "AAA" and "BBB" as delegate users to be given authorization to execute the print job.

Also, the login user corresponding to the owner of the print job may select a print driver that is to issue the print instruction for executing the print job from the delegate user setting screen 1110. Further, the login user corresponding to the owner of the print job may start a delegate user candidate setting process by pressing a delegate user candidate selection button 1111 included in the delegate user setting screen 1110, for example.

Figures 24, 25:
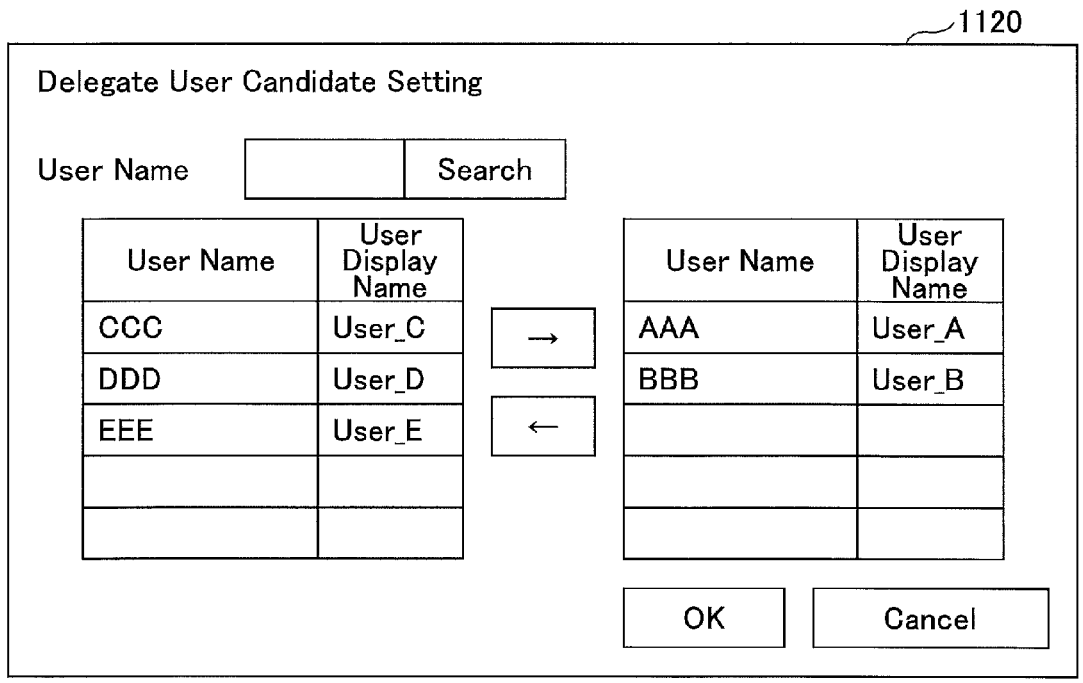
FIG. 24 illustrates an exemplary delegate user candidate setting screen.
FIG. 25 illustrates an exemplary data configuration of print job information.

When the login user corresponding to the owner of the print job presses the delegate user candidate selection button 1111, the client terminal 13 may prompt the display device 502 to display a delegate user candidate setting screen 1120 as illustrated in FIG. 24, for example. FIG. 24 illustrates an exemplary screen image of the delegate user candidate setting screen 1120.

The delegate user candidate setting screen 1120 includes display columns indicating user names and user display names each arranged at the left side and right side. In the delegate user candidate setting screen 1120 of FIG. 24, users indicated in the left side display column that are moved to the right side display column are set up as preset delegate users (delegate user candidates).

As described above, the owner may select a delegate user for each print job that is subject to a print job storage process via the delegate user setting screen 1110. After a delegate user for a print job subject to a print job storage process is selected, the job storage plug-in 72 of the client terminal 13 may store in the print server apparatus 10 print job information of the print job as illustrated in FIG. 25, for example.

FIG. 25 illustrates an exemplary data configuration of print job information. The print job information of FIG. 25 illustrates an exemplary case where "Owner_A" corresponding to the owner of the print job has selected "User_A" and "User_B" as delegate users. In FIG. 25, the user display name of the owner ("Owner_A") and the user IDs of the delegate users ("10" and "11") are indicated at the end of the PJL (Printer Job Language) JOB NAME command line.

The user ID is unique identification information assigned to each user at the authentication server apparatus 11. Thus, authorizations related to delegate printing may be delegated to suitable users by specifying their user IDs. Note that the user display name of the owner included in the print job information of FIG. 25 may be registered as information representing the user display name of the print job information of FIG. 21. Also, the user IDs of the delegate users included in the print job information of FIG. 25 may be registered as information representing print delegates of the print job information of FIG. 21. Note that the character "#" included at the end of the PJL JOB NAME command line represents a separator according to the PDL (Printer Description Language) that may be used to set up a plurality of print delegates, for example.

<<Owner Print Job Information List Screen>>

A login user corresponding to a delegate user may make a request to the image forming apparatus 12 to display an owner selection screen by pressing the "Select Owner" button 1052 of the print job information list screen 1050 of FIG. 13, for example. When the owner selection screen is displayed at the image forming apparatus 12, the login user may select an owner from the owner selection screen. In this way, a print job information list screen including a print job information list of print jobs of the selected owner having the login user designated as a delegate user may be displayed at the image forming apparatus 12.

Figure 26:
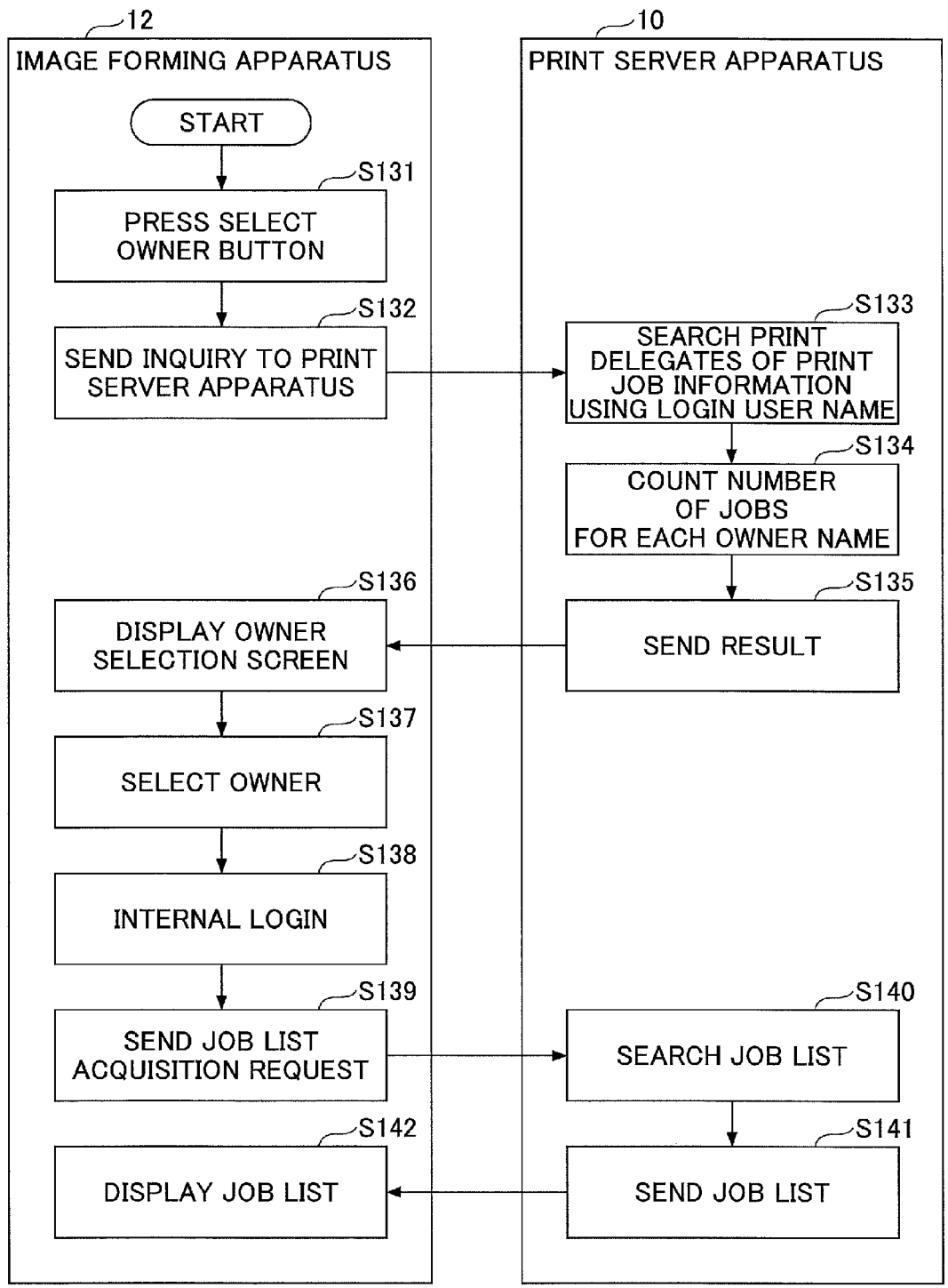
FIG. 26 is a flowchart illustrating another exemplary process for displaying a print job information list screen including print job information of an owner.

FIG. 26 is a flowchart illustrating another exemplary process of displaying a print job information list screen including print job information of print jobs of a selected owner.

In step S131, the operation receiving unit 41 of the image forming apparatus 12 receives an operation input corresponding to the login user pressing the "Select Owner" button 1052.

In step S132, the job information acquisition unit 44 sends an inquiry to the print server apparatus 10 regarding the number of print jobs of an owner that have the login user designated as a delegate user. Note that the job information acquisition unit 44 may send an inquiry to the print server apparatus 10 regarding the number of print jobs of a plurality of owners having the login user designated as a delegate user.

FIG. 27 illustrates an example of inquiry information that may be sent to the print server apparatus 10 to inquire about the number of print jobs of an owner. The inquiry information of FIG. 27 illustrates an exemplary case where the login user corresponds to "User_A". By receiving the inquiry information of FIG. 27, the printer server apparatus 10 may be notified of the information item "delegateUserId=10" indicating that an inquiry is being made with regard to print job information associated with the user ID "10" of "User_A" corresponding to the login user. Using the inquiry information of FIG. 27, the print server apparatus 10 may determine whether each print job registered in the print server apparatus 10 is delegated to the login user.

In step S133, the job information providing unit 23 of the print server apparatus 10 searches the information item "print delegates" of the print job information stored in the job information storage unit 26 using the user ID "10" of "User_A" as a search key. In step S134, the job information providing unit 23 counts the number of print jobs associated with each user name of each owner based on the search result.

In step S135, the job information providing unit 23 notifies the image forming apparatus 12 of the result of counting the number of print jobs associated with each user name of each owner as a response to the inquiry made by the image forming apparatus 12 in step S132. In step S136, the data display process unit 42 of the image forming apparatus 12 displays on the operation panel 602 an owner selection screen such as the owner selection screen 1060 illustrated in FIG. 16 based on the result of counting the number of print jobs associated with each user name of each owner received from the print server apparatus 10.

In step S137, the login user selects an owner from the owner selection screen 1060 and presses the "OK" button. In step S138, the job information acquisition unit 44 of the image forming apparatus 12 performs internal login using the authentication settings of the owner selected from the owner selection screen 1060. In the present example, it is assumed that information required for performing internal login is acquired from the authentication server apparatus 11 during the login process of the login user.

In step S139, the job information acquisition unit 44 of the image forming apparatus 12 sends an acquisition request to the print server apparatus 10 to acquire print job information of print jobs that have been delegated to the login user by the owner selected from the owner selection screen 1060. In step S140, the job information providing unit 23 of the print server apparatus 10 searches for print job information having the user ID of the login user set up in the information item "print delegates".

Also, the job information providing unit 23 acquires the server ID set up in the print job information acquired from the above search, and searches for server information that is associated with the acquired server ID. In step S141, the job information providing unit 23 sends the acquired print job information and the server information to the image forming apparatus 12.

The image forming apparatus 12 receives from the print server apparatus 10 the print job information of print jobs delegated to the login user by the selected owner and the server information associated with the server ID that is set up in the above print job information. In step S142, the data display process unit 42 of the image forming apparatus 12 displays on the operation panel 602 a print job information list screen such as the print job information list screen 1070 illustrated in FIG. 17 based on the received print job information of print jobs of the selected owner and the server information with the server ID included in the print job information.

By implementing the process of FIG. 26, a login user may easily prompt the image forming apparatus 12 to display the print job information list 1071 including print job information of print jobs delegated to the login user by an owner and issue a print instruction to execute a print job corresponding to the print job information selected from the print job information list 1071, for example. Also, an owner may easily set up a delegate user for each print job by selecting a desired user from the delegate user setting screen 1110, for example. In this way, procedures for setting up delegate printing may be simplified.

According to an aspect of the print system 1 of the present embodiment, an owner may easily set up a delegate user for each print job that is stored by the owner.

Although the present invention has been described above with reference to certain preferred embodiments, the present invention is not limited to these embodiments, and numerous variations and modifications may be made without departing from the scope of the present invention.

For example, the print system 1 described above is merely one illustrative example of an output system according to the present invention. That is, the present invention is not limited to a print system for managing print data and print job information but may be applied to other output systems handling other various types of output data. Also, the client terminal 13 is one illustrative example of a terminal apparatus used by a user to issue an output request for output data or an instruction to execute an output process.

The print server apparatus 10 is one illustrative example of an information processing apparatus (data storage apparatus) that stores output data such as print data and output data related information corresponding to information relating to the output data such as print job information, and transmits the output data and the output data related information to an output apparatus.

Thus, for example, if the output apparatus corresponds to a projector, the print server apparatus 10 may store display data (output data) to be projected (output) by the projector and settings (output data related information) such as the display method to be used upon projecting (outputting) the display data.

Also, in some embodiments, the print server apparatus 10 may store both print data and display data, for example. In this case, the print server apparatus 10 may transmit output data and output data related information to a plurality of different types of output apparatuses that output different types of output data such as a MFP that prints out print data and a projector that projects display data.

The authentication server apparatus 11 is one illustrative example of an information processing apparatus (authentication apparatus) that performs authentication in response to an authentication request and returns an authentication result to the sender of the authentication request. The owner is one illustrative example of a registering user that registers an output request for output data from a terminal apparatus. The delegate user is one illustrative example of an outputting user that operates an output apparatus such as the image forming apparatus 12 to output the output data. Note that in a case where the owner is also authorized to output the output data, the owner may also correspond to an outputting user.

The job registration process unit 22 is an illustrative example of a registration process unit including a function of registering an output request received from a terminal apparatus operated by a registering user. The job information acquisition unit 44 is an illustrative example of a selection receiving unit having a function of displaying, at an output apparatus operated by an outputting user, information of one or more registering users that designate the outputting user as a delegate user and receiving a selection of a registering user from the outputting user.

The job information providing unit 23 is an illustrative example of an output request providing unit including a function of receiving an acquisition request for acquiring an output request of a registering user that is selected by an outputting user and providing the output request of the selected registering user.

The job selection receiving unit 45, the print data acquisition unit 46, and the print process unit 48 are illustrative features embodying an output process unit including a function of receiving a selection of an output request for output data from an outputting user, a function of acquiring the output data of the selected output request from a storage destination, and a function of outputting the acquired output data.

Also, the authentication server apparatus 11 and the delegate printing plug-in 73 are illustrative embodiments of a delegate user setting unit of the present invention that includes a function of setting another user that is selected by a registering user as a delegate user and storing the delegate user setting.

Note that embodiments of the delegate user setting unit of the present invention may include a first delegate user setting unit that is implemented at the authentication server apparatus 11 and a second delegate user setting unit that is implemented at the delegate printing plug-in 73, for example.

The job information providing unit 23 implements a function of providing information related to output requests registered by a registering user that designate another user (outputting user) as a delegate user (e.g. number of output requests associated with each user name/user display name of each registering user). The job information providing unit 23 is an illustrative example of an information providing unit of the present invention.

Note that when providing the information related to output requests registered by a registering user, in some embodiments the information may be provided with respect to all print jobs registered by the registering user, and in other embodiments, the information may be provided with respect to output requests for which the registering user has designated the outputting user as a delegate user. In view of the above, the information providing unit implementing the function of providing information related to all output requests registered by the registering user may be referred to as "first information providing unit", and the information providing unit implementing the function of providing information related to output requests for which the registering user has designated the outputting user as a delegate user may be referred to as "second information providing unit", for example.

Note that the present invention can be implemented in any convenient form, for example, using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can comprise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implementable on a programmable device. The computer software can be provided to the programmable device using any non-transitory storage medium for storing processor readable code such as a floppy disk, a hard disk, a CD ROM, a magnetic tape device or a solid state memory device. The non-transitory storage medium can comprise any computer-readable medium except for a transitory, propagating signal.

The hardware platform includes any desired hardware resources including, for example, a central processing unit (CPU), a random access memory (RAM), and a hard disk drive (HDD). The CPU may include processors of any desired type and number. The RAM may include any desired volatile or nonvolatile memory. The HDD may include any desired nonvolatile memory capable of recording a large amount of data. The hardware resources may further include an input device, an output device, and a network device in accordance with the type of the apparatus. The HDD may be provided external to the apparatus as long as the HDD is accessible from the apparatus. In this case, the CPU, for example, the cache memory of the CPU, and the RAM may operate as a physical memory or a primary memory of the apparatus, while the HDD may operate as a secondary memory of the apparatus.

The present application is based on and claims the benefit of priority of Japanese Patent Application No. 2013-226967 filed on Oct. 31, 2013, the entire contents of which are hereby incorporated by reference.

What is claimed is:

1. An output system including a terminal apparatus, an output apparatus, and at least one information processing apparatus that are interconnected via a network, the output system comprising:
   a registration process unit configured to register an output request for output data received from the terminal apparatus that is operated by a registering user;
   a selection receiving unit configured to display at the output apparatus information on the registering user that has designated an outputting user operating the output apparatus as a delegate user, and receive a selection of the registering user from the outputting user;
   an output request providing unit configured to receive from the output apparatus an acquisition request for the output request of the registering user selected by the outputting user, and provide to the output apparatus the output request of the registering user selected by the outputting user; and
   an output process unit configured to receive a selection of the output request for output data from the outputting user, acquire the output data of the selected output request from a storage destination, and output the acquired output data at the output apparatus.

2. The output system as claimed in claim 1, further comprising:
   a first delegate user setting unit configured to receive a delegate user setting with respect to each registering user.

3. The output system as claimed in claim 2, further comprising:
   a first information providing unit configured to receive from the output apparatus an inquiry regarding a number of output requests of the registering user that has designated the outputting user as the delegate user, and provide to the output apparatus the number of output requests of the registering user that has designated the outputting user as the delegate user;
   wherein the selection receiving unit displays the number of output requests of the registering user that has designated the outputting user as the delegate user along with the information on the registering user.

4. The output system as claimed in claim 1, further comprising:
   a second delegate user setting unit configured to receive a delegate user setting with respect to each output request and set up the outputting user designated by the registering user as the delegate user in the output request of the registering user.

5. The output system as claimed in claim 4, further comprising:
   a second information providing unit configured to receive from the output apparatus an inquiry regarding the number of output requests having the outputting user set up as the delegate user, and provide to the output apparatus the number of output requests having the outputting user set up as the delegate user;
wherein the selection receiving unit displays the number of output requests having the outputting user set up as the delegate user along with the information on the registering user.

6. The output system as claimed in claim 1, wherein the output process unit displays a screen for receiving the selection of the output request for output data from the outputting user, and switches between displaying an output request for output data registered by the outputting user on the screen and displaying the output request for output data having the outputting user set up as the delegate user on the screen.

7. An output method that is executed in an output system including a terminal apparatus, an output apparatus, and at least one information processing apparatus that are interconnected by a network, the output method comprising:
 a registration process step of registering an output request for output data received from the terminal apparatus that is operated by a registering user;
 a selection receiving step of displaying at the output apparatus information on the registering user that has designated an outputting user operating the output apparatus as a delegate user and receiving a selection of the registering user from the outputting user;
 an output request providing step of receiving from the output apparatus an acquisition request for the output request of the registering user selected by the outputting user and providing to the output apparatus the output request of the registering user selected by the outputting user; and
 an output process step of receiving a selection of the output request for output data from the outputting user, acquiring the output data of the selected output request from a storage destination, and outputting the acquired output data at the output apparatus.

8. The output method as claimed in claim 7, further comprising:
 a first delegate user setting step of receiving a delegate user setting with respect to each registering user.

9. The output method as claimed in claim 8, further comprising:
 a first information providing step of receiving from the output apparatus an inquiry regarding a number of output requests of the registering user that has designated the outputting user as the delegate user, and providing to the output apparatus the number of output requests of the registering user that has designated the outputting user as the delegate user;
 wherein the selection receiving step includes displaying the number of output requests of the registering user that has designated the outputting user as the delegate user along with the information on the registering user.

10. The output method as claimed in claim 7, further comprising:
 a second delegate user setting step of receiving a delegate user setting with respect to each output request, and setting up the outputting user designated by the registering user as the delegate user in the output request of the registering user.

11. The output method as claimed in claim 10, further comprising:
 a second information providing step of receiving from the output apparatus an inquiry regarding the number of output requests having the outputting user set up as the delegate user, and providing to the output apparatus the number of output requests having the outputting user set up as the delegate user;
 wherein the selection receiving step includes displaying the number of output requests having the outputting user set up as the delegate user along with the information on the registering user.

12. The output method as claimed in claim 7, wherein the output process step includes displaying a screen for receiving the selection of the output request for output data from the outputting user, and switching between displaying an output request for output data registered by the outputting user on the screen and displaying the output request for output data having the outputting user set up as the delegate user on the screen.

13. An output apparatus that establishes communication with a terminal apparatus and at least one information processing apparatus, the output apparatus comprising:
 a selection receiving unit configured to display information on a registering user that has registered an output request for output data and has designated an outputting user operating the output apparatus as a delegate user, and receive a selection of the registering user from the outputting user;
 an output request acquisition unit configured to make an acquisition request to the information processing apparatus to acquire the output request of the registering user selected by the outputting user, and acquire from the information processing apparatus the output request of the registering user selected by the outputting user; and
 an output process unit configured to receive a selection of the output request for output data from the outputting user, acquire the output data of the selected output request from a storage destination, and output the acquired output data.

14. The output apparatus as claimed in claim 13, further comprising:
 a first acquisition unit configured to acquire a number of output requests of the registering user that has designated the outputting user as the delegate user;
 wherein the selection receiving unit displays the number of output requests of the registering user acquired by the first acquisition unit along with the information on the registering user.

15. The output apparatus as claimed in claim 13, further comprising:
 a second acquisition unit configured to acquire the number of output requests of the delegate user having the outputting user set up as the delegate user;
 wherein the selection receiving unit displays the number of output requests of the delegate user acquired by the second acquisition unit along with the information on the registering user.

* * * * *